(12) United States Patent
Sifferman et al.

(10) Patent No.: US 6,678,208 B2
(45) Date of Patent: *Jan. 13, 2004

(54) RANGE COMPUTATIONS FOR CORRELATION SPEED SENSOR

(75) Inventors: Andrew M. Sifferman, Bedford, NH (US); Roger H. Tancrell, Wilmington, MA (US); Stephen G. Boucher, Amherst, NH (US)

(73) Assignee: Airmar Technology Corporation, Milford, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/225,477

(22) Filed: Aug. 20, 2002

(65) Prior Publication Data

US 2003/0099156 A1 May 29, 2003

Related U.S. Application Data

(63) Continuation-in-part of application No. 10/166,581, filed on Jun. 7, 2002, which is a continuation of application No. 09/540,844, filed on Mar. 31, 2000, now Pat. No. 6,426,918
(60) Provisional application No. 60/149,491, filed on Aug. 18, 1999, and provisional application No. 60/358,288, filed on Feb. 20, 2002.

(51) Int. Cl.⁷ .............................................. G01S 15/60
(52) U.S. Cl. ........................................................ 367/89
(58) Field of Search ........................................... 367/89

(56) References Cited

U.S. PATENT DOCUMENTS

| | | |
|---|---|---|
| 3,066,279 A | 11/1962 | Marks |
| 3,657,924 A | 4/1972 | Kirk |
| 3,818,425 A | 6/1974 | Peynaud et al. |
| 3,885,873 A | 5/1975 | Andermo |
| 3,991,398 A | 11/1976 | Andermo et al. |
| 4,017,823 A | 4/1977 | Cooke et al. |
| 4,041,293 A | 8/1977 | Kihlberg |
| 4,068,207 A | 1/1978 | Andermo et al. |
| 4,104,912 A | 8/1978 | Clavelloux et al. |
| 4,166,229 A | 8/1979 | DeReggi et al. |
| 4,264,788 A | 4/1981 | Keidel et al. |
| 4,604,542 A | 8/1986 | Thompson |
| 4,633,119 A | 12/1986 | Thompson |
| 4,685,093 A | 8/1987 | Gill |
| 4,837,750 A | 6/1989 | Saunders |
| 4,905,207 A | 2/1990 | Fellinger et al. |
| 4,918,672 A | 4/1990 | Iwabuchi et al. |
| 5,077,700 A | 12/1991 | Shaw et al. |
| 5,089,996 A | 2/1992 | Masreliez |
| 5,235,557 A | 8/1993 | Masreliez |
| 5,581,515 A | 12/1996 | Masreliez |
| 5,838,635 A | 11/1998 | Masreliez |
| 6,426,918 B1 | 7/2002 | Bartz et al. |
| 2003/0053374 A1 * | 3/2003 | Bartz et al. .................. 367/89 |

FOREIGN PATENT DOCUMENTS

WO       WO 01/13129 A1     2/2001

OTHER PUBLICATIONS

XP–002243637, *Numerical Recipes in C: The Art of Scientific Computing*, Cambridge University Press, Ch. 3 pp. 105–108, Ch. 9 pp. 347–362 (1988–1992).
XP–002243638, "Appendix 1 Real Zeros of A Function", pp. 963–966.

* cited by examiner

*Primary Examiner*—Daniel T. Pihulic
(74) *Attorney, Agent, or Firm*—Hamilton, Brook, Smith & Reynolds, P.C.

(57) ABSTRACT

A time difference between two similar but time-shifted signals is determined using a difference function. For example, similar but time-shifted first and second signals are sampled to generate a discrete mathematical function whose discrete sample points define overlapping ranges. Typically, at least one of the multiple overlapping ranges defined by sample points of the discrete mathematical function can be used to interpolate a time difference between the first and second signals.

35 Claims, 25 Drawing Sheets

RANGE COMPUTATIONS FOR CORRELATION SPEED SENSOR

RELATED APPLICATION

This application is a Continuation-in-part of U.S. application Ser. No. 10/166,581 filed Jun. 7, 2002 entitled "Correlation Speed Sensor," which itself is a continuation of U.S. application Ser. No. 09/540,844 filed Mar. 31, 2000, now U.S. Pat. No. 6,426,918, issued Jul. 30, 2002 claiming the benefit of U.S. Provisional Application Serial No. 60/149,491 filed Aug. 18, 1999 entitled "Correlation Speed Sensor," the entire teachings of all of which are incorporated herein by reference. This application also claims the benefit of U.S. Provisional Application serial No. 60/358,288 filed on Feb. 20, 2002, the entire teachings of which are also incorporated herein by reference.

BACKGROUND OF THE INVENTION

Speed sensors used in aquatic applications such as those used to determine the speed of a vessel moving through water have become more accurate at the cost of increased complexity. In the past, paddle-wheel type speed sensors were used but are now outdated due to the fact that they are vulnerable to damage by debris in the water and often impart an undesirable drag on the boat, thus, impeding forward motion. More advanced speed sensors include sophisticated electronics coupled to ultrasonic transducer pairs spaced on a motion axis of a vessel to monitor a forward speed.

According to suggested ultrasonic speed detection methods, two spaced transducers are used to monitor regions beneath the bottom-side of a vessel. Ultrasonic signals from each transducer are emitted towards randomly located reflective particles from such objects as air bubbles present in the water, while corresponding reflected signals are sampled by each respective transducer. Since the monitoring transducers are located along an axis in line with the forward motion of the vessel, each transducer monitors a substantially similar set of reflective surfaces when the vessel is moving forward. In other words, a first sensor detects reflections from a set of random particles in a fluid, while a second sensor detects reflections off a substantially similar set of the random particles at a later time based on the forward motion. Accordingly, a time difference associated with the two substantially matching but time-shifted signals can then be used in conjunction with transducer separation to determine vessel speed.

There are drawbacks associated with the aforementioned side-by-side ultrasonic transducer speed sensor. For example, significant signal processing power must typically be employed to accurately determine vessel speed since two entire sets of sampled data corresponding to the location of the vessel at a given instant in time must be analyzed to accurately determine the time difference between the two sampled reflection signals. This is a heavy price to pay for accurately determining speed of a vessel.

SUMMARY OF THE INVENTION

The present invention provides several novel improvements for reducing the complexity of processing and comparing signals. Generally, the signal processing improvements disclosed herein reduce the complexity of determining a time difference between two similar but time-shifted signals, including the processing platform upon which a corresponding algorithm runs. In one application, a simplified set of data samples are processed to derive vessel speed, without unduly compromising accuracy of the speed sensor.

More particularly, one aspect of the present invention is directed towards a system and method to determine a time difference between two similar but time-shifted signals. In an illustrative embodiment, first and second signals are sampled to generate a discrete mathematical function whose discrete sample points define overlapping ranges. For example, the discrete mathematical function itself can be a function defined by multiple discrete sample points. Typically, at least one of the multiple overlapping ranges defined by sample points can be used to interpolate a point on the mathematical function indicating a time difference between the first and second signals. Consequently, the mathematical function characterizing a time relationship between the first and second signals can be used to determine speed or other measurable quantities.

In one embodiment, the discrete mathematical function is a difference function correlating echo signals from multiple monitored regions. The echo signals can be reflections from particles, inconsistencies or structures disposed in a fluid. Each of the first and second signals can be sampled to incrementally generate a mathematical function at discrete sample points. Also, each of the first and second signals can be compared to a respective threshold signal to generate a discrete mathematical function that is in turn used to determine a time difference between the first and second signals.

A mathematical function such as a difference function can be generated at discrete sample points based on signal sampling in a first time interval. The difference function can then be analyzed in a range defined by a first pair of sample points of the difference function to interpolate a time difference between the echo signals for sample data taken in the first interval.

The mathematical function can be updated based on new samplings or signal sampling in a second time interval. For example, the difference function can be updated by continuous, periodic or intermittent sampling of the first and second signals. Consequently, the updated difference function can be analyzed to determine a time difference between signals at a particular snapshot in time.

A time difference between two echo signals can be interpolated in a particular range between sample points of the difference function. If interpolation can not be used in a given range to determine a time difference between signals, another pair of sample points of the difference function whose range at least partly overlaps with a previous pair of sample points can be used to determine a time difference between multiple signals. This technique of utilizing overlapping ranges for successive calculations can be used to more accurately determine a time difference between signals, especially if the time difference between signals is changing.

For example, consider that a change in vessel speed causes the difference function to change. As the difference function changes, a new overlapping range can be used to determine a time difference between signals. Thus, the use of multiple sample points to define overlapping ranges can result in more accurate readings and smoother transitions in displayed speed when presented to a pilot or user.

As mentioned, characteristics of the first and second signals can change over time as a result of a changing relative speed of monitored particles with respect to corresponding sensors. This results in a change in the difference function and reporting of vessel speed.

Other more specific aspects of the present invention can be employed to identify, for example, the relative speed or throughput of a fluid through a conduit such as a pipe. In this instance, a sensor device can be disposed to monitor a flow in which first and second signals are generated from guided fluid or reflective particles in the guided fluid passing through monitored regions.

A generated discrete mathematical function can include a unique point such as a zero-crossing that reflects a time difference between the first and second signals. The zero-crossing can be an imaginary or real point on the difference function that intersects with a particular reference such as an axis. More specifically, the zero-crossing can be a point at which the discrete mathematical function intercepts a reference. A specific position of the zero-crossing of the difference function can be calculated using mathematical techniques such as interpolation. For example, an imaginary line or curve can be drawn between the sample points of the difference function to determine at what point the function intersects a time axis or other relevant reference. The intersection can indicate an offset of time at which a near-perfect correlation exists between the first and second signals.

In one application, a magnitude of the first signal is proportional to an intensity of reflections in a first monitored region and a magnitude of the second signal is proportional to an intensity of reflection in a second monitored region. Consequently, speed such as vessel speed or fluid speed can be determined based on a motion of reflective structures or surfaces such as bubbles or particles that pass through both the first and second regions, but at different times. As the relative speed of reflective structures such as bubbles or particles increases through a monitored region, there will be a smaller offset in time between the two signals. Conversely, as the speed of the sensor decreases relative to corresponding reflective structures, there will be a larger offset in time between the two signals.

To reduce an amount of data that is processed to generate the mathematical function, each of the first and second received signals can be compared to a respective threshold. The compare results, such as a single bit indicating whether the first or second signal is greater or less than a respective running threshold, can be stored in a buffer to incrementally generate the mathematical function over a specified duration of time. Consequently, minimal circuitry such as processor and storage devices need be employed to calculate vessel speed, reducing the size of electronics and sensor that is used to monitor the corresponding first and second regions.

In one application, the mathematical function correlating echo signals is generated at logarithmically spaced sample times. However, any suitable spacing of sample points can be used to generate a discrete function.

Further, the mathematical function can be generated based on an intensity of reflections in a selected layer at a predetermined depth in the first and second monitored regions. Multiple layers at different depths are optionally monitored to generate a correlation function.

It should be noted that the first and second signals may not correlate exactly with each other. For example, the mathematical function can include non-linearities as a result of statistical variations between the first and second signals. The use of overlapping ranges to identify a time difference between first and second signals can be used to more accurately determine a time difference, especially when a time difference between signals changes quickly over time. Ideally, a vessel speed derived from the discrete mathematical function at any point in time accurately reflects an actual speed of a vessel, especially when it is accelerating or decelerating so that a pilot can navigate accordingly.

In a specific application, the discrete mathematical function is based on an auto-correlation function of the first signal, an auto correlation function of the second signal and a cross-correlation function between the first and second signals. However, any suitable mathematical function for correlating multiple signals can be used to determine a time difference between signals.

Multiple overlapping ranges of the difference function can be used at different times to calculate a time difference between the first and second signals. More specifically, a zero-crossing of the mathematical function can be calculated in a first range of multiple overlapping ranges defined by sample points. Based on new sample data and corresponding incremental changes to the mathematical function, a zero-crossing can drift outside the first range. A second range at least partly overlapping with the first range can be identified in which a new zero-crossing falls. Consequently, the new zero-crossing can be interpolated in the second range. This technique of interpolating a zero-crossing in overlapping ranges over time renders it possible to calculate a more accurate time difference between signals. More specifically, when a time difference between signals is used to determine vessel speed, a corresponding calculated vessel speed can more accurately track the changing time difference and therefore an actual speed of an accelerating or decelerating vessel.

In one application, a time difference between signals is not interpolated in a new overlapping range unless the corresponding new zero-crossing of the mathematical function falls outside a previous range that was used to interpolate the zero-crossing.

As mentioned, one purpose for calculating a time difference between two signals is to measure vessel speed. In this instance, a transmitter such as an ultrasonic transducer can generate pings in monitored regions of water. Echo signals resulting from pings off reflective particles can be generated for each of multiple regions.

Vessel speed can be calculated based on sampling over multiple time intervals. For example, a calculated vessel speed can be displayed to a pilot when the time difference between echo signals is interpolated using a same range for two successive time intervals in which the difference function is generated. In one application, the displayed vessel speed is a weighted average of previously calculated vessel speeds.

As discussed, one aspect of the present invention is to generate a correlation function based on a substantially reduced data set. For example, a single bit compare result data stored in the shift registers can be used to generate a function for determining the time difference between signals. Although only a single bit is stored for a sample compare, each bit can contain enough information about the corresponding reflection signal that an accurate time difference between signals can be determined based on processing data at selected tap points of the shift register following collection of each sample. For example, multiple logarithmically spaced data taps on the shift registers can provide enough information in a 65 bit wide shift register to generate an accurate correlation function.

Another aspect of the present invention is to incrementally generate a correlation function based on tapped data from a shift register such as 65 bits wide. Based on this topology, there is no need to accumulate and simultaneously process an exorbitant amount of data such as successive 16 bit A/D readings to generate a mathematical function relating multiple signals. Rather, the correlation function or equation used in the present invention is generated incrementally while only a reduced set of sample data is stored at any given time. Consequently, a relatively small memory device can provide sufficient storage space for data samples that are used to generate the discrete mathematical function. A relatively simple processing device therefore can be used to process such data.

These and other advantages of the present invention will be described in more detail throughout this specification.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
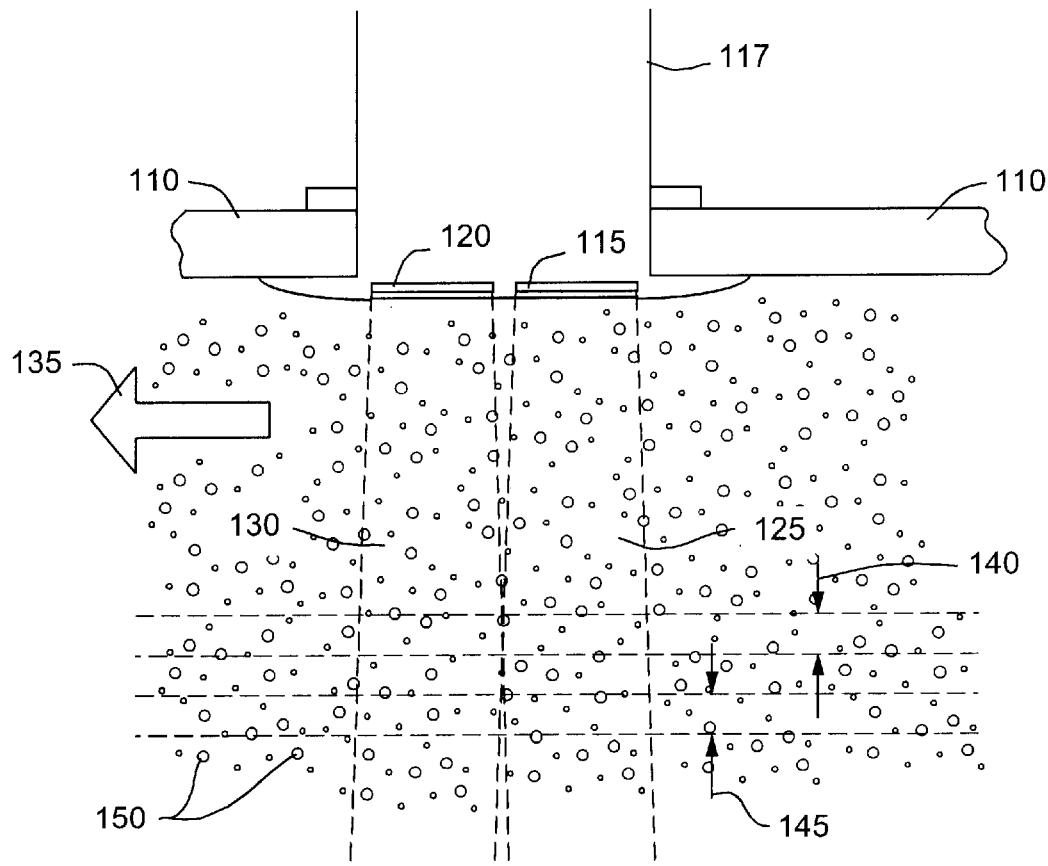
FIG. 1 is a schematic cross-section view of the present invention that illustrates the disposition of two sensors monitoring randomly located reflective particles in a medium according to certain principles of the present invention.

FIG. 1 shows an embodiment of the present invention where a first ultrasonic transducer 120 and second ultrasonic transducer 115 are positioned on a motion axis (arrow 135) of a vessel 110, such as a boat hull, for detecting vessel speed. Random particles 150 or inconsistencies located in water provide a reflective surface off which transmitted signals or ultrasonic pings from the first and second ultrasonic transducers 120, 115 respectively are reflected. Ultrasonic pings are typically transmitted from each respective transducer at the same time and transducers are appropriately spaced to reduce cross-talk.

In addition to generating signals such as pings, first transducer 120 and second transducer 115 also can be used to detect respective reflections off the randomly located reflective particles 150. In one application, a monitored region is a predetermined layer beneath the speed sensor 117 such as range bin 140 or 145. Reflective particles 150 in a respective monitored region typically include bubbles, plankton, seaweed or the like including stationary objects such as an ocean floor or rocks.

Typically, range bin 140 is located 3 to 5" beneath vessel hull 110, and is about ¼ inch in thickness. A second range bin 145 is optionally monitored for echo signals in addition to the first range bin 140, thus providing more data for accurately calculating a time difference between signals.

Monitoring multiple range bins according to an embodiment of the present invention results in the acquisition of an optimal pool of statistical samples upon which vessel speed calculations are based. For example, a particular range bin may be void of reflective particles altogether, making it difficult to generate an accurate time difference correlation function. Other selected range bins may include many reflective particles.

The spacing between the first and second range bin 140, 145 can be ½ inch and optimized according to the application. Although only two range bins 140 and 145 are shown in FIG. 1, any reasonable number of range bins can be monitored for determining vessel speed.

Sampling within each range bin 140 can be controlled by precise time-sampling of reflection signals for each respective transducer 120, 115 following an ultrasonic ping. For example, each transducer can generate an ultrasonic beam 125, 130 that is directionally transmitted beneath vessel hull 110 away from a corresponding transducer towards a range bin as shown. The ultrasonic signals travel at a known speed through the medium in which randomly located particles 150 are suspended.

The reflections off the randomly located particles also travel at an ultrasonic speed back to the respective transducer 115, 120. Accordingly, each ultrasonic transducer 115, 120 is sampled at the appropriate time or during an interval of time following a transmit signal to properly monitor a range bin 140 at a desired depth. The reflection signal at the given depth is then recorded for later determining vessel speed.

Figure 2:
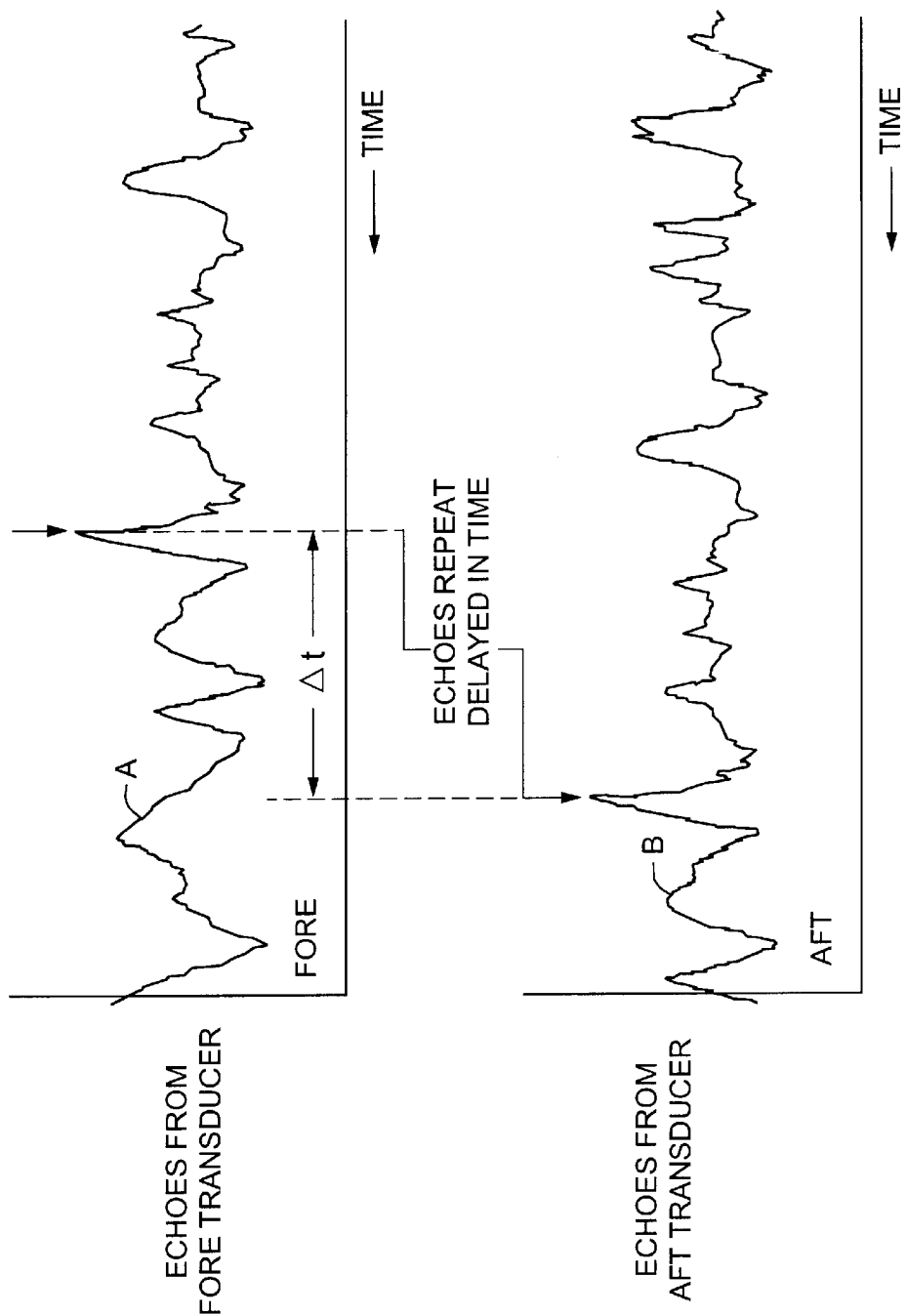
FIG. 2 is a plot of echo signal amplitude versus time of two similar but time-shifted reflection signals according to certain principles of the present invention.

FIG. 2 shows an example of reflected echoes of a first and second transducer. For example, each ultrasonic transducer can be coupled to electronic circuitry that generates a reflection signal indicative of the intensity of a reflection signal. A first echo signal A is compared to a second echo signal B to determine a delay time, $\Delta t$, between the similar but time-shifted reflection signals. Based on this time difference $\Delta t$ and the spacing $\Delta d$ between centers of the first and second transducer 120, 115 (FIG. 1), a vessel speed can be calculated.

It should be noted that the shape of the signals in FIG. 2 is merely exemplary and that actual signals used in the present invention may vary depending on the application. More details regarding reflection signals and corresponding time difference or correlation functions is specifically described later in the specification.

Figure 3:
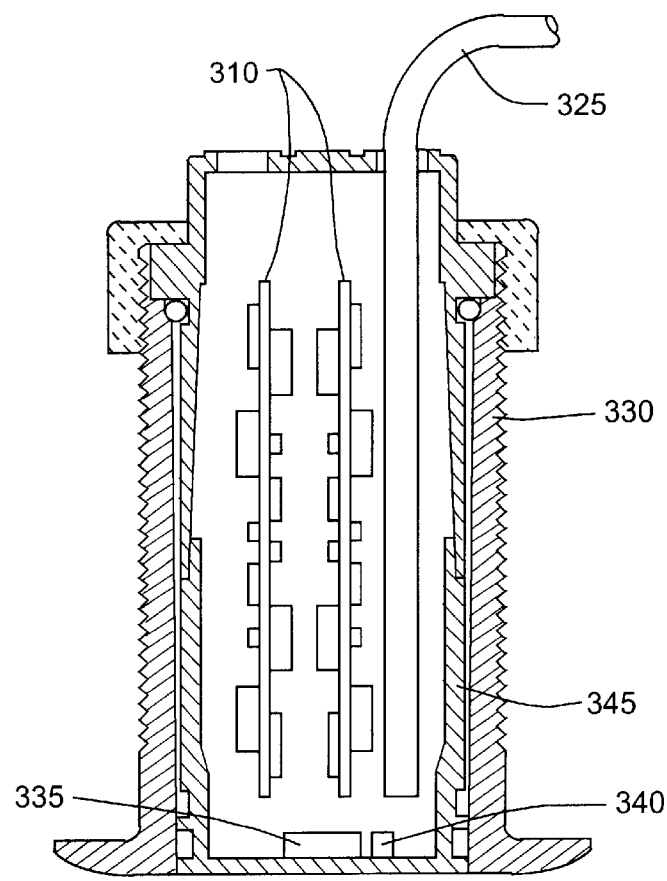
FIG. 3 is a cross-sectional view of components in a speed sensor application according to certain principles of the present invention.

FIG. 3 illustrates a side view of the correlation sensor including housing 330 that is threaded for installation of the speed sensing device in bored vessel shells. Electronic circuitry resides on circuit board 310 for storing and processing data from first and second ultrasonic sensors located at position 335. An interface cable 325 in communication with electronic circuitry 310 provides a medium in which speed calculations or other status information is communicated to other devices on board the vessel. For example, speed information is typically transmitted digitally via communication link 325 to a display monitor conveying the calculated speed of the vessel to the pilot.

Figure 4:
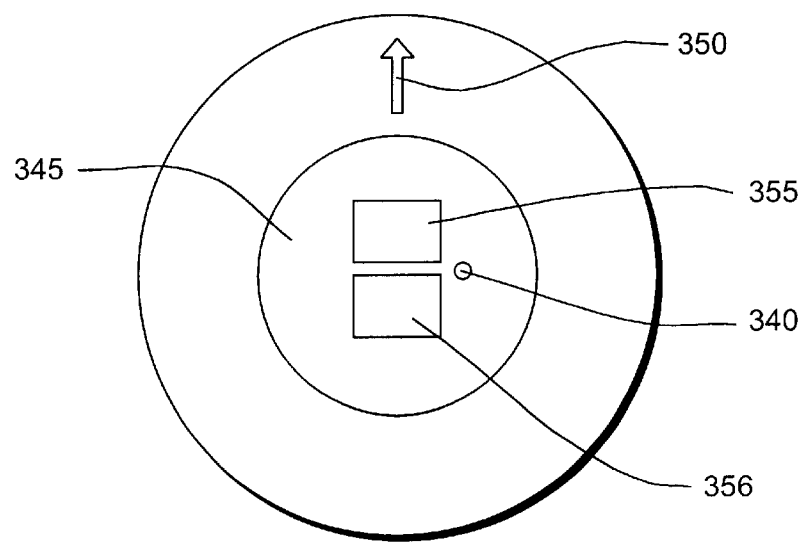
FIG. 4 is a top view of components in a vessel speed sensor application according to certain principles of the present invention.

The bottom view of housing 330 in FIG. 4 illustrates a first and second transducer 355, 356 aligned approximately on an axis 350 of the forward motion of a vessel. Typically, there is a small gap between transducers 355, 356 so that there is little or no cross-talk between them, i.e., each transducer should be substantially independent of the other to prevent interference of transmitted and received ultrasonic signals. This small gap may produce an error in the time difference correlation function, but it does so minimally affecting vessel speed calculations.

Based on a positioning of sensors 355, 356, the monitored first and second region lie directly beneath each sensor. While the vessel is moving in a forward direction, each transducer monitors a substantially same set of reflective particles but at different times. As mentioned, this time difference can be ultimately used to calculate vessel speed when the vessel moves forward through a region of randomly located reflective surfaces 150 (FIG. 1) disposed in the beam path of sensors 355, 356.

As shown in FIGS. 3 and 4, temperature sensor 340 can be used to detect the temperature of fluid in communication with retractable sensor insert 345 such as the temperature of water beneath a boat hull.

In one embodiment, transducers 355, 356 produce highly directional ultrasonic beams towards randomly located particles 150 in the analyzed medium such as water. A square shape (from top view) of each transducer renders it possible to more accurately monitor a square-shaped range bin. Accordingly, the square shape of the transducers contributes to linearize the time difference correlation function.

Spacing of monitored regions can be adjusted for efficient use. For example, it can be beneficial that adjacent monitored regions, in addition to being square-shaped, are contiguous on a common leg and are non-overlapping. Based on this orientation, the corresponding shape of the resulting time difference correlation function can be analyzed using linear mathematics.

Figure 5:
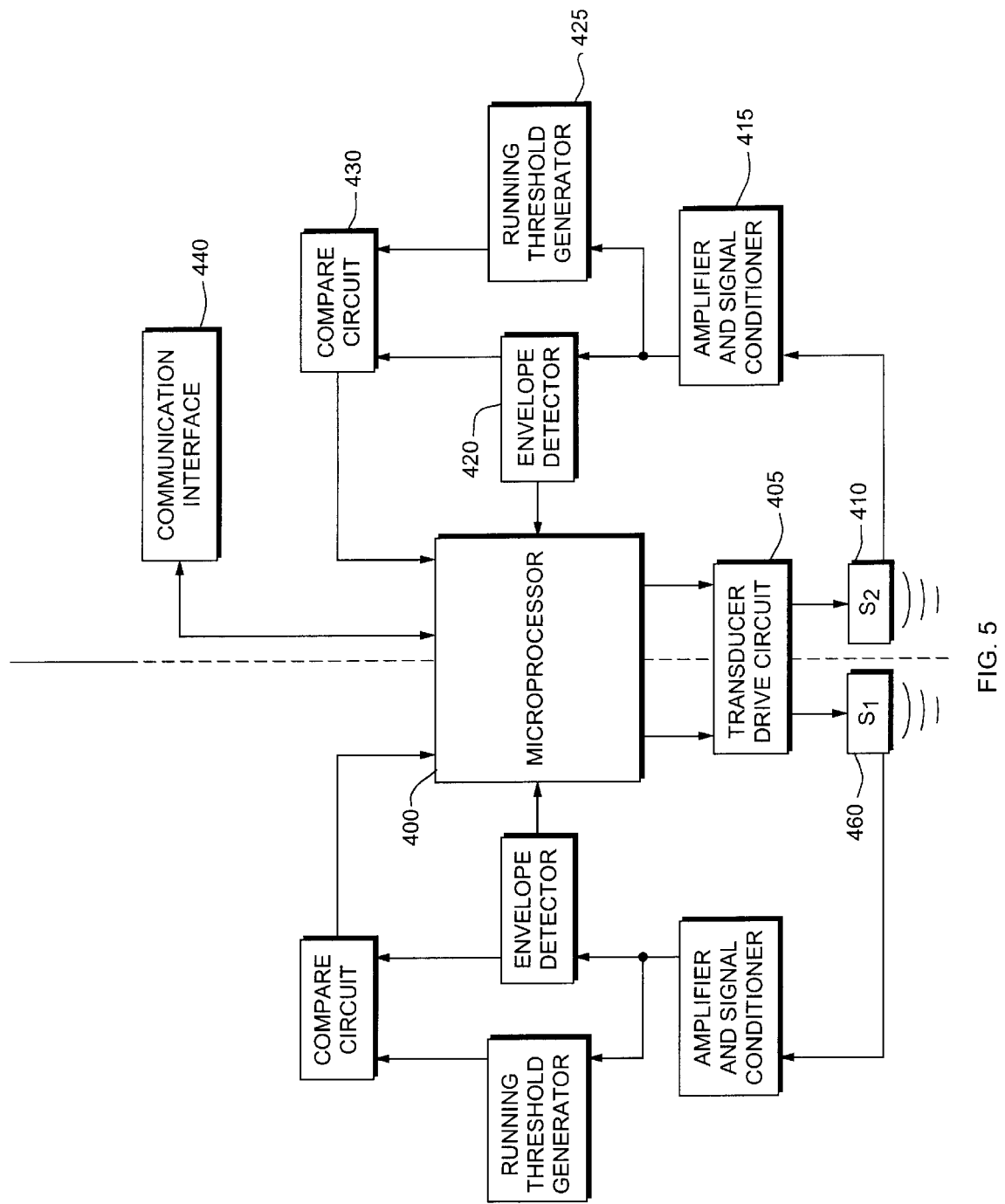
FIG. 5 is a block diagram of electronics and related components in a correlation speed sensor according to certain principles of the present invention.

FIG. 5 is a block diagram of electronic circuitry and ultrasonic transducer elements. A first transducer 410 and second transducer 460 are driven by transducer drive circuit 405. In one embodiment, transducers 410 and 460 produce ultrasonic pings at a rate of 5.7 KHz, where each ping is 18 consecutive cycles at 4.5 MHZ. Typically, each transducer 410, 460 is driven so that both transducers 410, 460 emit a ping at the same time.

In addition to transmitting ultrasonic signals, each transducer 410, 460 can act as an ultrasonic sensor or receiver. Amplifier and signal conditioner circuitry 415 provides high gain to electronically amplify a received reflection signal since it is typically a relatively small signal. The reflection signal output of the amplifier and signal conditioner 415 is typically sinusoidal or an AC-like signal of varying amplitude, similar to an amplitude modulated radio signal. This amplified received reflection signal is thereafter fed into envelope detector 420 and running threshold generator 425.

Envelope detector 420 is used to detect the envelope or signal intensity of the amplified reflection signal. The output of the envelope detector 420 is a signal proportional to the intensity of the reflection signal and is fed into compare logic 430.

Running threshold generator 425, as its name suggests, generates a reference voltage corresponding to a running average of each respective reflection signal. The running threshold can include an offset proportional to the signal itself such as between 5 and 20 dB. However, a fixed offset is optionally used to generate the running threshold. The output of the running threshold generator 425 is a running threshold signal embodied as a reference voltage. This reference voltage also can be fed into compare logic circuitry 430.

In one embodiment, the running average of a respective reflection or echo signal is tracked only during the time that a range bin 140,145 (FIG. 1) is sampled. This is due to the fact that echoes outside of these bins may be drastically higher or lower than reflection signal levels detected within a range bin. For example, immediately following an ultrasonic ping, there is typically a very intense reflection due to disturbance of water in communication with the hull of the moving vessel. If this portion of the reflection signal were included in the running threshold, the result would naturally be higher, degrading the effectiveness of the comparison between a running threshold and instantaneous reflection signal intensity. In short, more accurate results can be obtained when the running threshold is generated based on signals within a monitored range bin.

Tracking the running average of a reflection signal at a particular depth is achieved using a switch to control analog circuit generating the running threshold voltage. When a range bin is sampled, the switch is activated so that the running average and, therefore, running threshold is updated accordingly. Conversely, the switch is deactivated during non-sample time periods so that the running threshold value is maintained until the next sample period. In this way, each respective running threshold is proportional to echoes or reflections of particles in the desired range bins.

The running threshold can be an analog voltage generated by an RC circuit with a time constant of approximately one millisecond. This is approximately a magnitude slower than the sample rate of 5.7 KHz. Hence, the running threshold is comparably slow-changing with respect to changes in the intensity of the echo signal itself.

Compare logic circuitry 430 provides hardware for comparing running threshold voltage to the intensity of the reflection signal. As mentioned, a sample compare is precisely timed following an ultrasonic ping to monitor a range bin 140 (FIG. 1) at a predetermined depth.

Within each range bin, several compare samples are generated. For example, a reflection intensity signal from envelope detector 420 output is compared to a running threshold at four to five times per range bin. In other words, each range bin is typically sampled at 4 or 5 different sub-layers for the detection of reflective particles. Again, a sample is timed appropriately following a ping to monitor a desired range bin and sub-layers.

If sampling within a range bin results in a reflection signal greater than the running threshold, a logic 1 is recorded for the range bin sample. Conversely, a logic 0 is recorded for the range bin sample if all of the reflection signal samples in a range bin are less than the running threshold reference signal.

In one embodiment, as mentioned, the running threshold can be 12 dB above the running average of a respective echo signal. As a result, a logic one is not recorded for a sample within a range bin unless the intensity of the reflection signal is relatively strong. Based on adjusting the offset of the running threshold, it is possible to discriminate between larger and smaller reflective particles. For example, when the offset in the running threshold is set high, only relatively high intensity reflections corresponding to ultrasonic reflections off larger particles are recorded as a logic 1.

Microprocessor 400 typically includes ample memory for storage of sample data. Moreover, it also includes the algorithm for processing sampled data stored in memory. Although block 400 is labeled as a microprocessor, different functional packaging can be achieved using alternative electronic components.

Communication interface 440 coupled to microprocessor 400 can provide a way to transmit and receive data to remote devices. For example, communication interface 440 can support serial communication of data such as calculated speed to a display for viewing.

It should be noted that although the blocks shown in FIG. 5 provide details of components and associated interconnections, packaging of electronics is not necessarily as important as the functional nature of the circuitry itself. There are known substitutes for each of the blocks and described components. For example, microprocessor or micro-controller 400 optionally includes external memory devices such as RAM or FIFOs.

Figure 6:
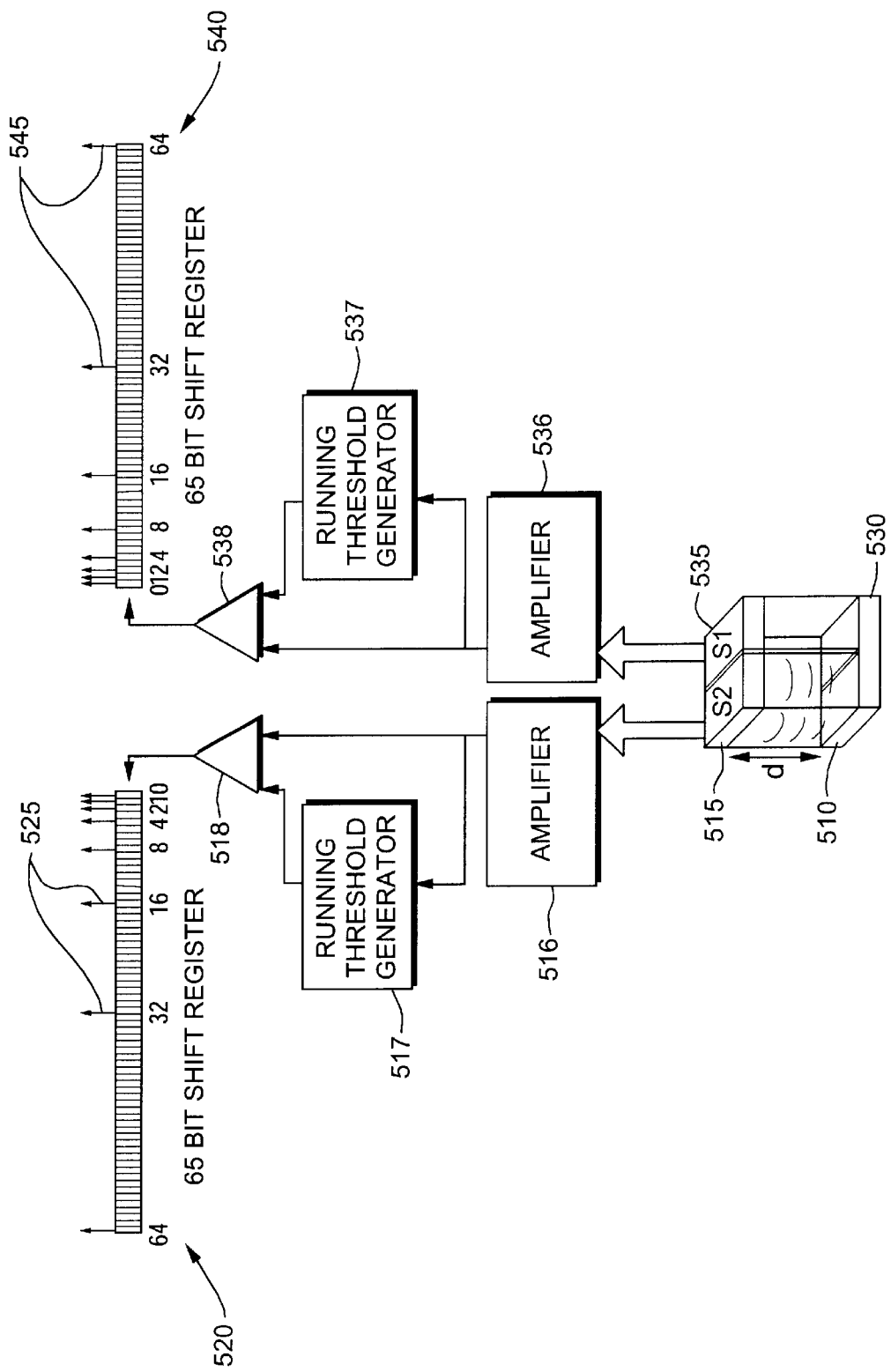
FIG. 6 is a block diagram that illustrates further details of how each reflection signal is processed and how results are compared and stored in a tapped shift register according to certain principles of the present invention.

FIG. 6 illustrates how sample data from sensors or transducers 515, 535 is processed and then stored in memory for the generation of a correlation function, which is described in more detail later in this specification.

First transducer 515 and second transducer 535 transmit ultrasonic pings toward respectively monitored range bins 510 and 530. The ping rate can be fixed at 5.7 KHz, which transmits an 18 cycle long acoustic wave at a frequency of 4.5 MHZ. It should be noted that transducer spacing and ping rate are optionally adjusted for the range of speeds detected in the application. Likewise, the running threshold level for compare purposes can be adjusted to detect relatively larger or smaller particles as mentioned.

A low level transducer reflection signal as detected by respective transducers 515,535 is fed into respective amplifiers 516,536 as shown in FIG. 6. The output of the amplifier 516,536 is then fed into respective compare circuitry 518, 538 and running threshold generator 517,537. Each running threshold generator produces a running threshold reference voltage which is used for compare purposes. For example, the amplified reflection signal is compared to the running threshold using compare circuitry 518,538, where results are thereafter stored in shift registers (FIFOs) 520,540. As mentioned, a sample compare can be timed appropriately following each ultrasonic ping issued at a rate of 5.7 KLHz.

Sample compare results are typically stored as single bit results in each respective FIFO 520,540, where data is shifted for storage of each new sample. Since FIFO 520,540 is 65 bits wide, data in the last register is lost as each new sample compare data is stored in FIFO 520,540.

As shown, tapped elements 525, 545 in FIFOs 520,540 are logarithmically spaced. Following storage of a sample compare data in the respective FIFO, the sample data in tapped elements is then used to generate an optimal correlation function for essentially determining the time difference between the first and second reflection signals.

Figure 7:
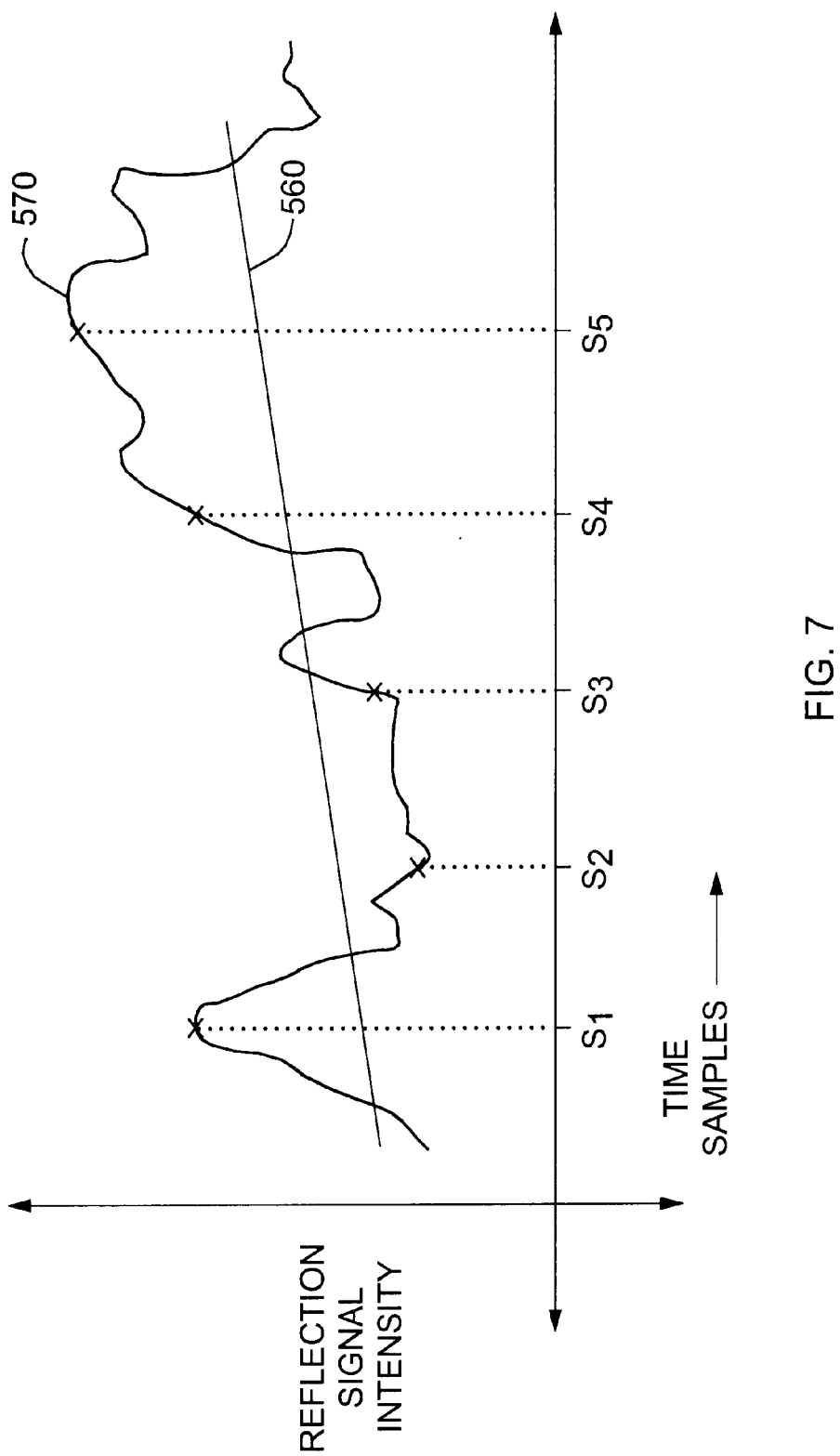
FIG. 7 is an illustration of a sample reflection signal and associated running threshold signal, which are compared to generate a result that is stored in the tapped shift register according to certain principles of the present invention.

FIG. 7 is a graph showing an intensity of an echo or reflection signal 570 and corresponding running threshold 560. A sample of reflection signal 570 at time $S_1$ is compared to running threshold 560. If the echo or reflection signal 570 of a sampled transducer is less than the corresponding running threshold 560, a logic 0 is recorded for that sample compare. Conversely, a logic 1 is recorded for a sample compare when the sample of the echo or reflection signal 570 is greater than the corresponding running threshold 560. Hence, for sample $S_1$, a logic 1 would be stored in the shift register (FIFOs) 520,540 (FIG. 6). Likewise, for sample $S_2$ a logic 0 would be stored in the shift register (FIFOs) 520,540 (FIG. 6) because the running threshold 570 is greater than intensity of the reflection signal at the sample time. The following table summarizes compare results for the graph shown in FIG. 7.

| Sample | Binary Compare Result |
|--------|----------------------|
| S1     | 1                    |
| S2     | 0                    |
| S3     | 0                    |
| S4     | 1                    |
| S5     | 1                    |

In one embodiment, however, each range bin is typically sampled 4 or 5 times and a logic 1 is recorded if any of the samples in a particular range bin 140 (FIG. 1) is greater than the running threshold 560. Hence, if sample S1 through S4 correspond with 4 samples taken at different depths within a range bin, a logic 1 would be stored in the shift register because at least one of the samples within the range bin was greater than the running threshold 560.

A time difference correlation function can be used to accurately determine the time difference value between echo signals for calculating vessel speed. More specifically, the time difference function can be generated from the digitized sample data stored in FIFOs 520,540 (FIG. 6) for each respective reflection signal. Specifically, an auto-correlation function is generated for each respective sample log while a cross-correlation function can be generated based on data from both the first and second reflection signal.

An auto-correlation function for this system can be written as:

$$AC_{S1}(\lambda) = \int_{-\infty}^{+\infty} S1(t) \times S1(t+\lambda) dt$$

$$AC_{S2}(\lambda) = \int_{-\infty}^{+\infty} S2(t) \times S2(t+\lambda) dt$$

and a cross-correlation function can be written as:

$$CC_{S1S2}(\lambda) = \int_{-\infty}^{+\infty} S1(t) \times S2(t+\lambda) dt$$

Figure 8:
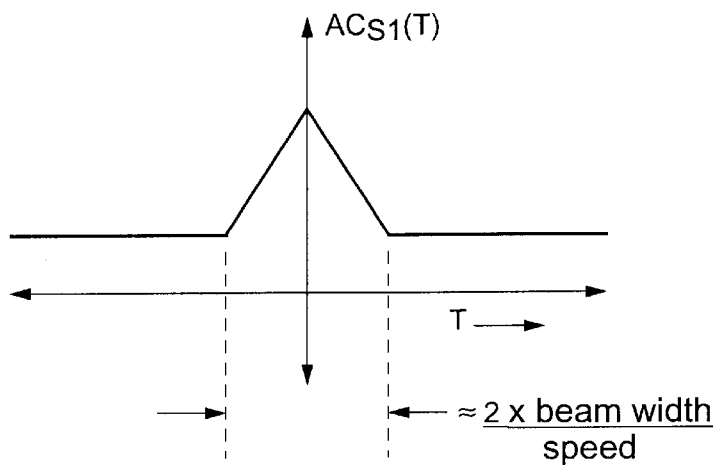
FIG. 8 is a graph of an auto-correlation signal of the first reflection signal according to certain principles of the present invention.
Figure 9:
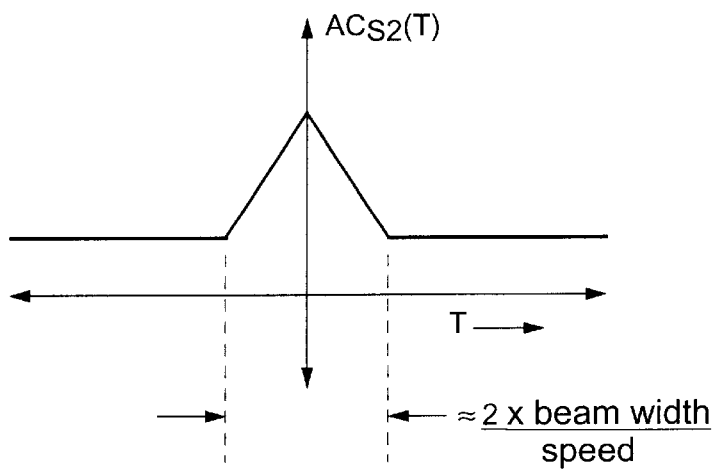
FIG. 9 is a graph of an auto-correlation signal of the second reflection signal according to certain principles of the present invention.
Figure 10:
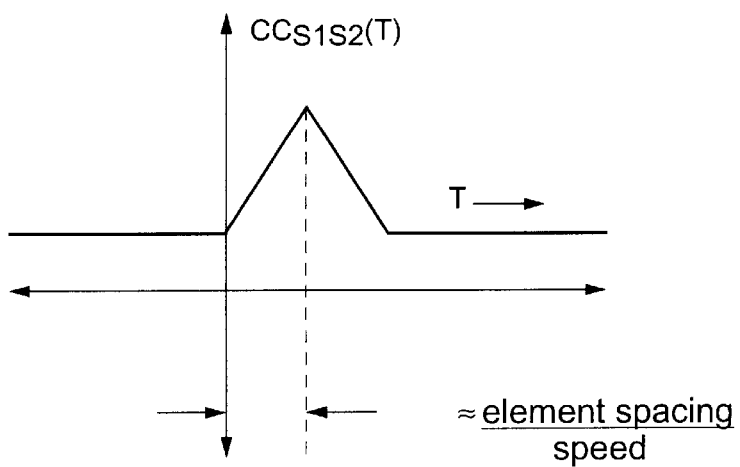
FIG. 10 is a graph of a cross-correlation function based on the first and second reflection signal according to certain principles of the present invention.

In discrete form, the above expressions can be further reduced to produce auto and cross-correlation functions as follows:

$$AC_{S1}(T) = \sum_{n=0}^{N-1} S1(n) \times S1(n+T)$$

$$AC_{S2}(T) = \sum_{n=0}^{N-1} S2(n) \times S2(n+T)$$

and $$CC_{S1S2}(T) = \sum_{n=0}^{N-1} S1(n) \times S2(n+T)$$

where N equals the number of discrete samples in a sample pool, i.e., 2850 consecutive samples at a rate of 5.7 KHz, T is the sample period or ping rate and n is a present discrete sample. A first and second auto-correlation function are shown in FIGS. 8 and 9 respectively. Likewise, an example of the cross-correlation function is illustrated in FIG. 10.

The shape of the correlation function of the present invention is substantially linear due to the shape of the transducers and monitored range bin, which is typically rectangular. In the one embodiment, both square-shaped transducers are positioned in close proximity such that the rectangular areas monitored (top view) by each transducer or sensor are contiguous on a common side of the rectangular area. In other words, the monitored region from a top view appears as two non-overlapping squares touching on a common leg or side.

The aforementioned method of digitizing the data also contributes to linearize the time difference function supporting simplified mathematical calculations. Although a linear time difference correlation function can be more beneficial, it is also possible to use non-linear time difference correlation functions to calculate speed based upon the methods recited herein.

The difference correlation function can be derived from the addition of the auto-correlation function for each sample log less twice the cross-correlation function. In mathematical terms, the equation is as follows:

$$DF(T) = AC_{S1}(T) + AC_{S2}(T) - 2CC_{S1S2}(T)$$

In discrete terms the equation is:

$$DF(T) = \sum_{n=1}^{N} \left[ (S1(n) \times S1(n+T)) + (S2(n) \times S2(n+T)) - 2(S1(n) \times S2(n+T)) \right]$$

Figure 11:
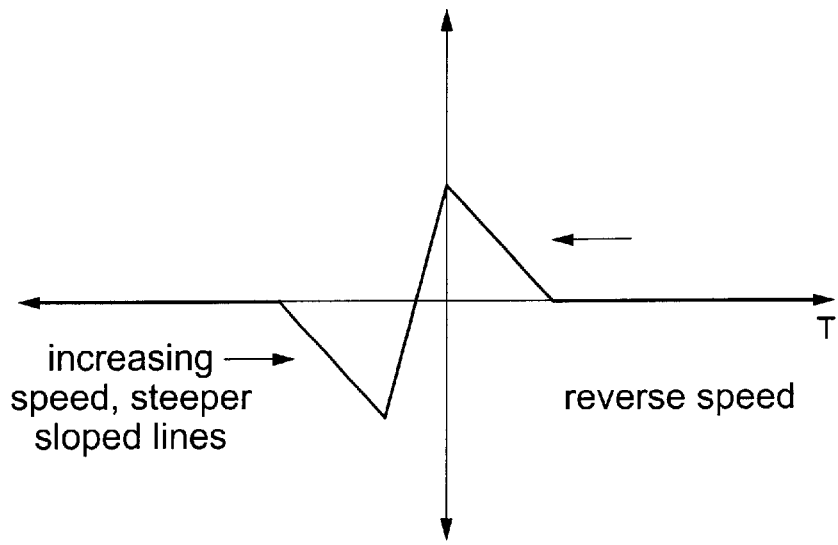
FIG. 11 is a graph of a reverse speed correlation function based on equations according to certain principles of the present invention.
Figure 12:
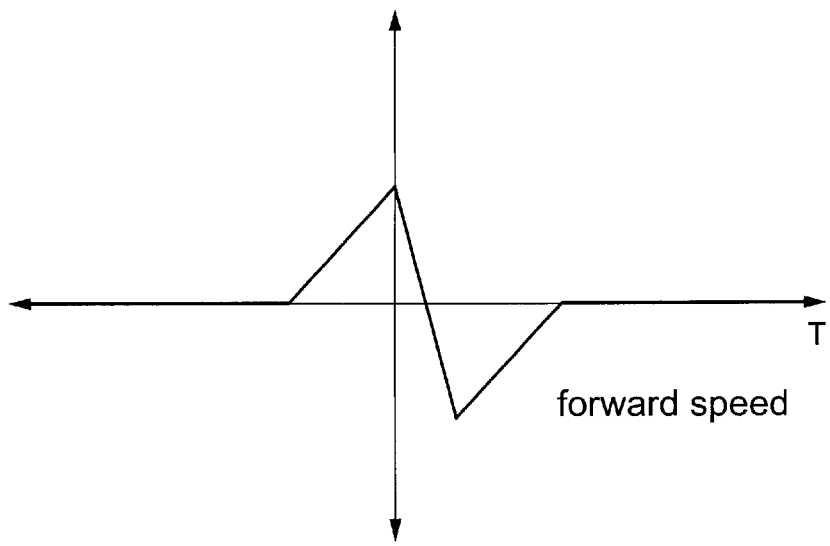
FIG. 12 is a graph of a forward speed correlation function according to the equations according to certain principles of the present invention.

FIGS. 11 and 12 graphically depict the difference correlation function for a reverse and forward speed respectively. For higher speeds, the slopes of the lines becomes steeper. Conversely, slower vessel speeds result in flatter peaks and valleys on the difference correlation function.

The difference correlation function is typically evaluated at several well chosen points as follows:

$$DF(T_1) = \sum_{i=1}^{2850} S1_0(t_i)S1_1(t_i) + S2_0(t_i)S2_1(t_i) - 2S1_0(t_i)S2_1(t_i)$$

$$DF(T_2) = \sum_{i=1}^{2850} S1_0(t_i)S1_2(t_i) + S2_0(t_i)S2_2(t_i) - 2S1_0(t_i)S2_2(t_i)$$

$$DF(T_4) = \sum_{i=1}^{2850} S1_0(t_i)S1_4(t_i) + S2_0(t_i)S2_4(t_i) - 2S1_0(t_i)S2_4(t_i)$$

$$DF(T_8) = \sum_{i=1}^{2850} S1_0(t_i)S1_8(t_i) + S2_0(t_i)S2_8(t_i) - 2S1_0(t_i)S2_8(t_i)$$

$$DF(T_{16}) = \sum_{i=1}^{2850} S1_0(t_i)S1_{16}(t_i) + S2_0(t_i)S2_{16}(t_i) - 2S1_0(t_i)S2_{16}(t_i)$$

$$DF(T_{32}) = \sum_{i=1}^{2850} S1_0(t_i)S1_{32}(t_i) + S2_0(t_i)S2_{32}(t_i) - 2S1_0(t_i)S2_{32}(t_i)$$

$$DF(T_{64}) = \sum_{i=1}^{2850} S1_0(t_i)S1_{64}(t_i) + S2_0(t_i)S2_{64}(t_i) - 2S1_0(t_i)S2_{64}(t_i)$$

For example, the value of each component, namely $S1_0$ $S1_m + S2_0$ $S2_m - 2$ $S1_0$ $S2_m$, is calculated following each newly stored sample and is summed over a half second of time samples, i.e., 2850 samples.

Figure 17:
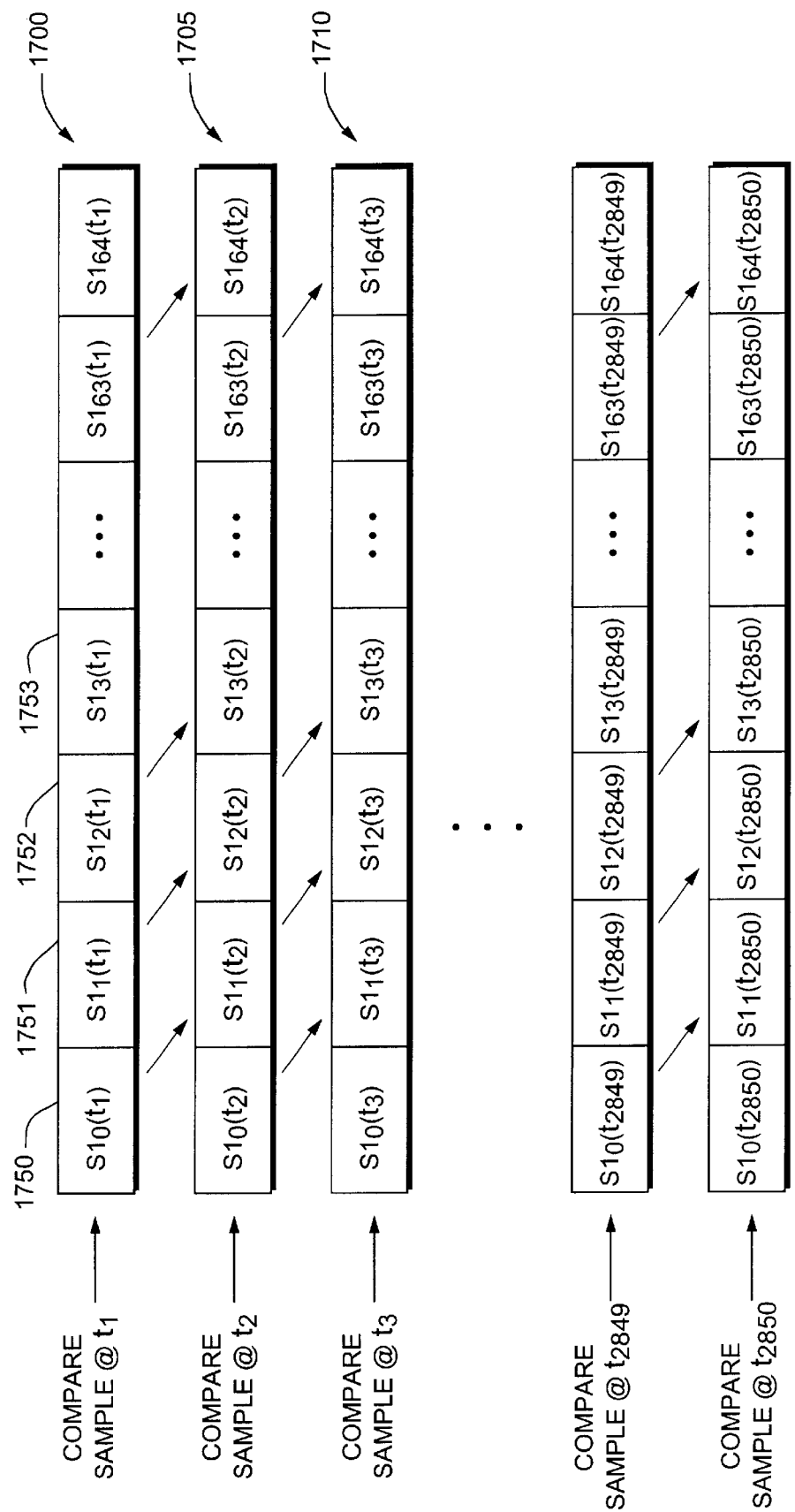
FIG. 17 is a diagram illustrating sample images of the binary information in the shift registers in a snapshot in time and corresponding mapping to the first reflection signal equation according to certain principles of the present invention.

FIG. 17 is a diagram illustrating a bit image of the 65 bit wide register 1700 for the first reflection signal at a given sample time. As shown, each new bit compare is shifted into the register (1700,1705,1710) from the left, wherein a cell such as 1750, 1751, 1752, and 1753 is labeled with corresponding equation mapping information. For example, $S1_0$ ($t_1$) is the bit compare result for the first reflection signal in the first cell 1750 of the 65 bit wide shift register 1700 for sample time or snapshot at time $t_1$. The 2850 data samples in the bit images are incrementally used to generate the corresponding DF(T) values at $T_0$, $T_1$, $T_2$, $T_4$, $T_8$, $T_{16}$, $T_{32}$ and $T_{64}$ in the above equations. Notably, relatively few bits are stored in the corresponding 65 bit wide shift register at any given time.

Rows of sample data 1700, 1705, etc., identify sample compare information collected for a particular time interval. Each successive row includes at least some of the compare sample data from the previous row because the information is shifted for each new sampling of the received signal. Consequently, the difference function can be constantly updated based on new sample compare information.

Figure 18:
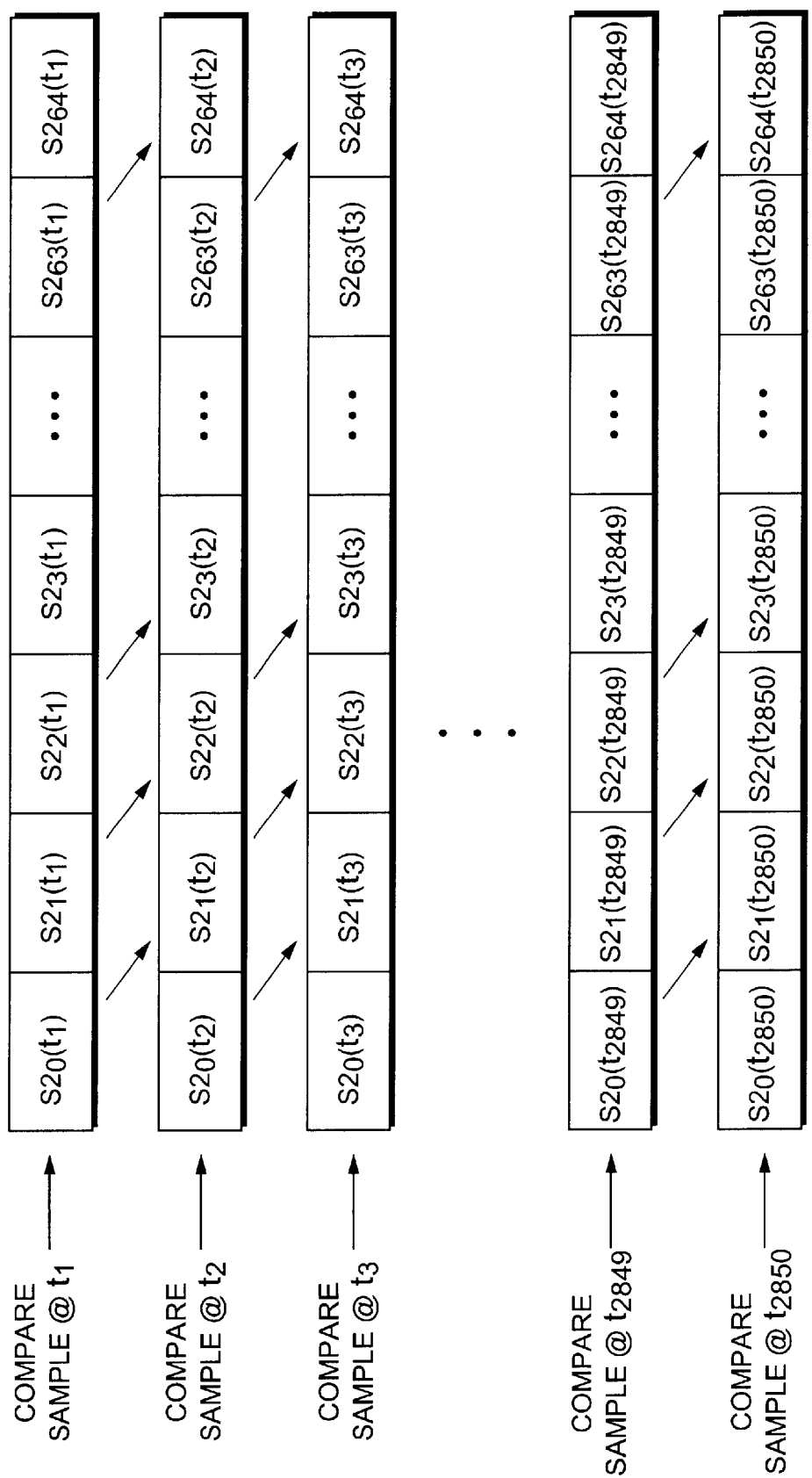
FIG. 18 is a diagram illustrating sample time images of the binary information in the shift registers at a snapshot in time and corresponding mapping to the second reflection signal equation according to certain principles of the present invention.

Likewise, FIG. 18 is a diagram illustrating a bit sample image for the second reflection signal.

Figure 13:
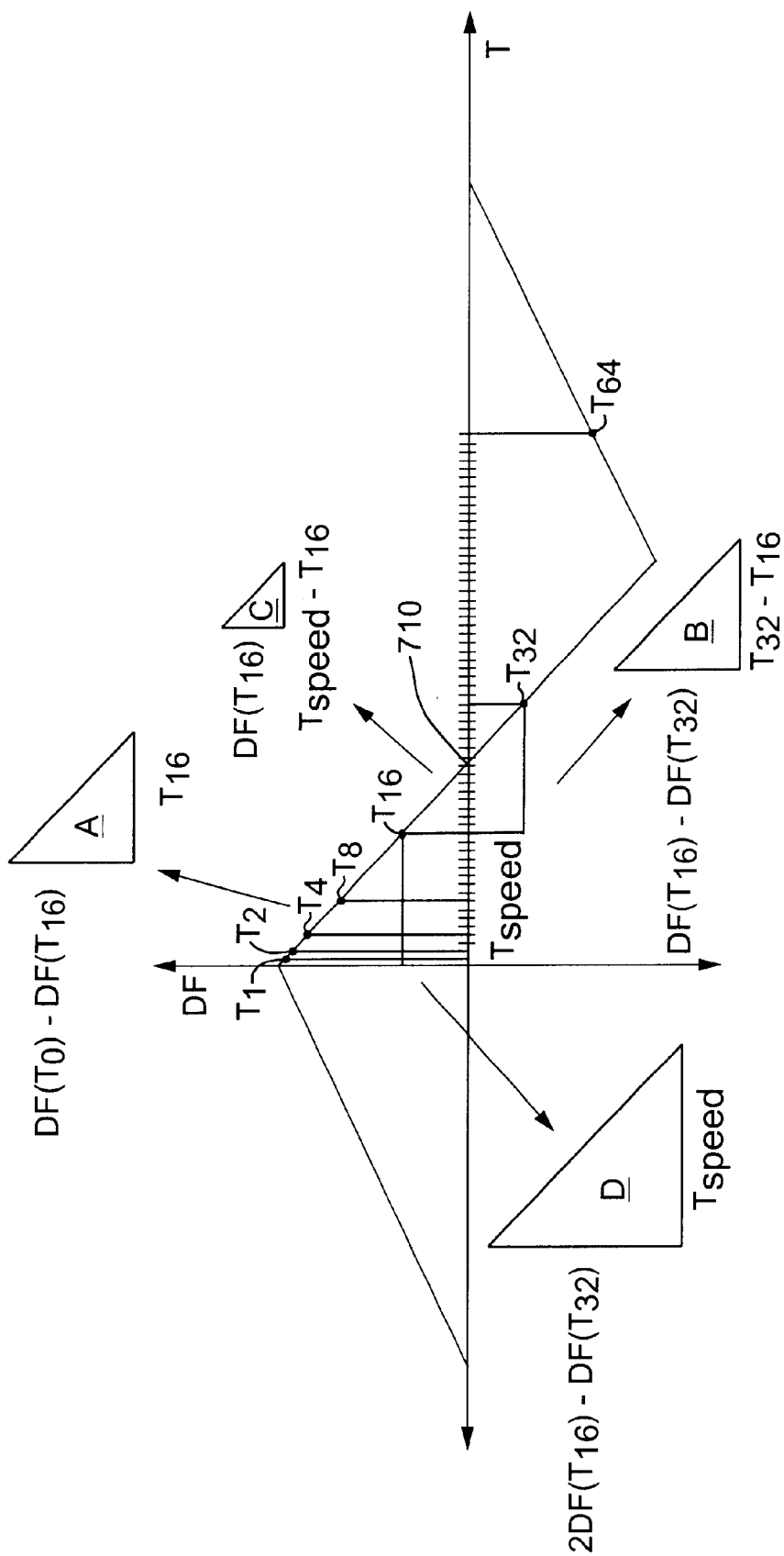
FIG. 13 is a graph illustrating a correlation function and a method of analyzing same according to certain principles of the present invention.

Based on the bit sample data stored in the FIFOs at a given snapshot in time, the difference correlation function is generated as illustrated in FIG. 13 using the equations in the table above.

As mentioned, the time difference correlation function is generated incrementally for each new sample of data stored in the shift register. For example, the difference function is the summation of components, i.e., $S1_0S1_m + S2_0S2_m - 2S1_0S2_m$ as described in the above equations over a half second sample period. For a new ½ second sample period, DF($T_1$) through DF($T_{64}$) are initially set to zero. Following each new sample stored in the shift register, results for the equations above are incrementally added to generate a final result for DF($T_1$) through DF($T_{64}$).

In the equations above, S1 and S2 correspond to reflection or echo data from the first and second signal respectively, while the subscripts correspond to the tap points 525, 545 (FIG. 6) on the corresponding shift register (FIFOs) 520,540 (FIG. 6). For example, $S1_0$ is the binary value of the zero$^{th}$ tap of the first reflection signal 1750 (FIG. 17), $S1_0$ is the binary value of the first tap of the first reflection signal 1751 (FIG. 17), and so on. Likewise, $S2_1$ is the binary value of the first tap of second reflection signal, and so on.

Each DF(T) is calculated based on standard or binary arithmetic using the binary values at the corresponding taps in the shift registers where:

$1 \times 1 = 1$ $0 \times 1 = 0$ $1 \times 0 = 0$ $0 \times 0 = 0$

It should be noted that a logical operation such as an XOR is optionally used in the above equations in lieu of multiplication.

As mentioned, after a new sample compare value is stored in the corresponding shift register, the difference function component, namely:

$$S1_0S1_m + S2_0S2_m - 2S1_0S2_m$$

for each DF($T_M$) is computed and summed with the last value for a given $T_M$, where M=logarithmic tap point 0,1,2,4,8, ... 64. Based on the summation of these components for each sample compare over a half second sample range, each logarithmically spaced DF(T) is incrementally generated. The resulting values for DF($T_1$), DF($T_2$), DF($T_4$), DF($T_8$), DF($T_{16}$), DF($T_{32}$) and DF($T_{64}$) comprise a time difference correlation function.

The time difference correlation function as shown in FIG. 13 includes a zero-crossing point on the T-axis (horizontal axis), which mathematically corresponds with the time difference between the first and second reflection signal. Based on the delay time between the first and second reflection signal, vessel speed can be calculated. The zero-crossing point is estimated using either interpolation or extrapolation among data points on the difference correlation function, i.e., DF(T) values at $T_0$, $T_1$, $T_2$, $T_4$, $T_8$, $T_{16}$, $T_{32}$ and $T_{64}$. An example of the zero-crossing point is shown in FIG. 13 at reference number 710.

According to the principles of the present invention, the amount of data manipulation or number-crunching is substantially reduced because essentially only 7 points are used to create the difference correlation function, i.e., the following points define the difference correlation function at DF($T_1$), DF($T_2$), DF($T_4$), DF($T_8$), DF($T_{16}$), DF($T_{32}$) and DF($T_{64}$). A precise Δt is determined from the difference function by calculating the zero-crossing point as shown at 710 or $T_{SPEED}$. Since the function is approximately linear, interpolation or extrapolation techniques based on linear mathematics can be used to determine $T_{SPEED}$. Accordingly, a vessel speed is calculated by:

$$\text{Speed} = \text{ping rate} \frac{\text{element spacing}}{2 \times T_{\text{SPEED}}}$$

This equation is derived from proportional triangles A, B, C, and D as illustrated in FIG. 13.

Based on this equation, $T_{SPEED}$ at point 710 is calculated. Known dimensions of triangle B are substituted into unknown triangle A. Based on the geometries, it can be shown that:

$$\frac{DF(T_{16}) - DF(T_{32})}{2DF(T_{16}) - DF(T_{32})} = \frac{T_{16}}{T_{speed}} = \frac{\frac{16}{\text{ping rate}}}{\frac{\text{element spacing}}{2 \times \text{speed}}}$$

In the instant case, vessel speed for a $T_{SPEED}$ zero-crossing point 710 between $T_{16}$ and $T_{32}$ is:

$$\text{speed} = \frac{\text{ping rate} \frac{\text{sensor element spacing}}{2}}{16} \times \left( \frac{DF(T_{16}) - DF(T_{32})}{2DF(T_{16}) - DF(T_{32})} \right)$$

The following equations are used to calculate vessel speed based upon where the zero-crossing 710 lies on the difference correlation function:

| SPEED RANGE | SPEED EQUATION |
|---|---|
| $T_1 - T_2$ | $\dfrac{\text{ping rate} \cdot \dfrac{\text{elementspacing}}{2}}{1} \cdot \dfrac{DF(T_1) - DF(T_2)}{2DF(T_1) - DF(T_2)} = \text{speed}$ |
| $T_2 - T_4$ | $\dfrac{\text{ping rate} \cdot \dfrac{\text{elementspacing}}{2}}{2} \cdot \dfrac{DF(T_2) - DF(T_4)}{2DF(T_2) - DF(T_4)} = \text{speed}$ |
| $T_4 - T_8$ | $\dfrac{\text{ping rate} \cdot \dfrac{\text{elementspacing}}{2}}{4} \cdot \dfrac{DF(T_4) - DF(T_8)}{2DF(T_4) - DF(T_8)} = \text{speed}$ |
| $T_8 - T_{16}$ | $\dfrac{\text{ping rate} \cdot \dfrac{\text{elementspacing}}{2}}{8} \cdot \dfrac{DF(T_8) - DF(T_{16})}{2DF(T_8) - DF(T_{16})} = \text{speed}$ |
| $T_{16} - T_{32}$ | $\dfrac{\text{ping rate} \cdot \dfrac{\text{elementspacing}}{2}}{16} \cdot \dfrac{DF(T_{16}) - DF(T_{32})}{2DF(T_{16}) - DF(T_{32})} = \text{speed}$ |
| $T_{32} - T_{64}$ | $\dfrac{\text{ping rate} \cdot \dfrac{\text{elementspacing}}{2}}{32} \cdot \dfrac{DF(T_{32}) - DF(T_{64})}{2DF(T_{32}) - DF(T_{64})} = \text{speed}$ |

For example, if the zero-crossing lies between $T_8$ and $T_{16}$, the corresponding speed equation is employed to determine the time difference between signals. These equations are derived from the mathematical methods as described in FIG. 13.

FIGS. 14a through 14f illustrate a method of determining vessel speed based upon the difference correlation function. The routine can be repeated on a continuous basis, constantly generating a vessel speed based on the first and second reflection signal.

In step 905, a value is computed for $DF(T_1)-DF(T_2)$. A range check is then performed for both $DF(T_1)$ and $DF(T_1)-DF(T_2)$ in step 910. If the values fall within the appropriate range indicating reasonable data, then the routine continues at step 920. If the value of $DF(T_1)$ or $DF(T_1)-DF(T_2)$ falls outside a predetermined range, no speed is found and the last speed is held-over for 2 seconds in step 912.

The difference function at $T_0$ is then calculated in step 920 based on $2DF(T_1)-DF(T_2)$. If the result of calculated $DF(T_0)$ in step 920 does not fall within an appropriate predetermined range in step 925, the routine continues at step 955 for the next speed range check, i.e., $T_2T_4$ Speed Range in FIG. 14b. Otherwise, speed is calculated based on equations in steps 930, 935 and 940.

The value of "57 Kt" in step 930 is based on the ping rate and transducer or receiver element spacing. For example, 57 Kt/1=[ping rate×(element spacing/2)]/1 is the first component of the speed equation for range $T_1T_2$ as shown in the Speed Range/Speed Equation table above. In one embodiment, the ping rate is set to 5.7 KHz and the element spacing is 0.405 inches. A conversion factor of 0.049 is used to convert from inches/second to nautical miles/hour, i.e., knots.

Figure 14A:
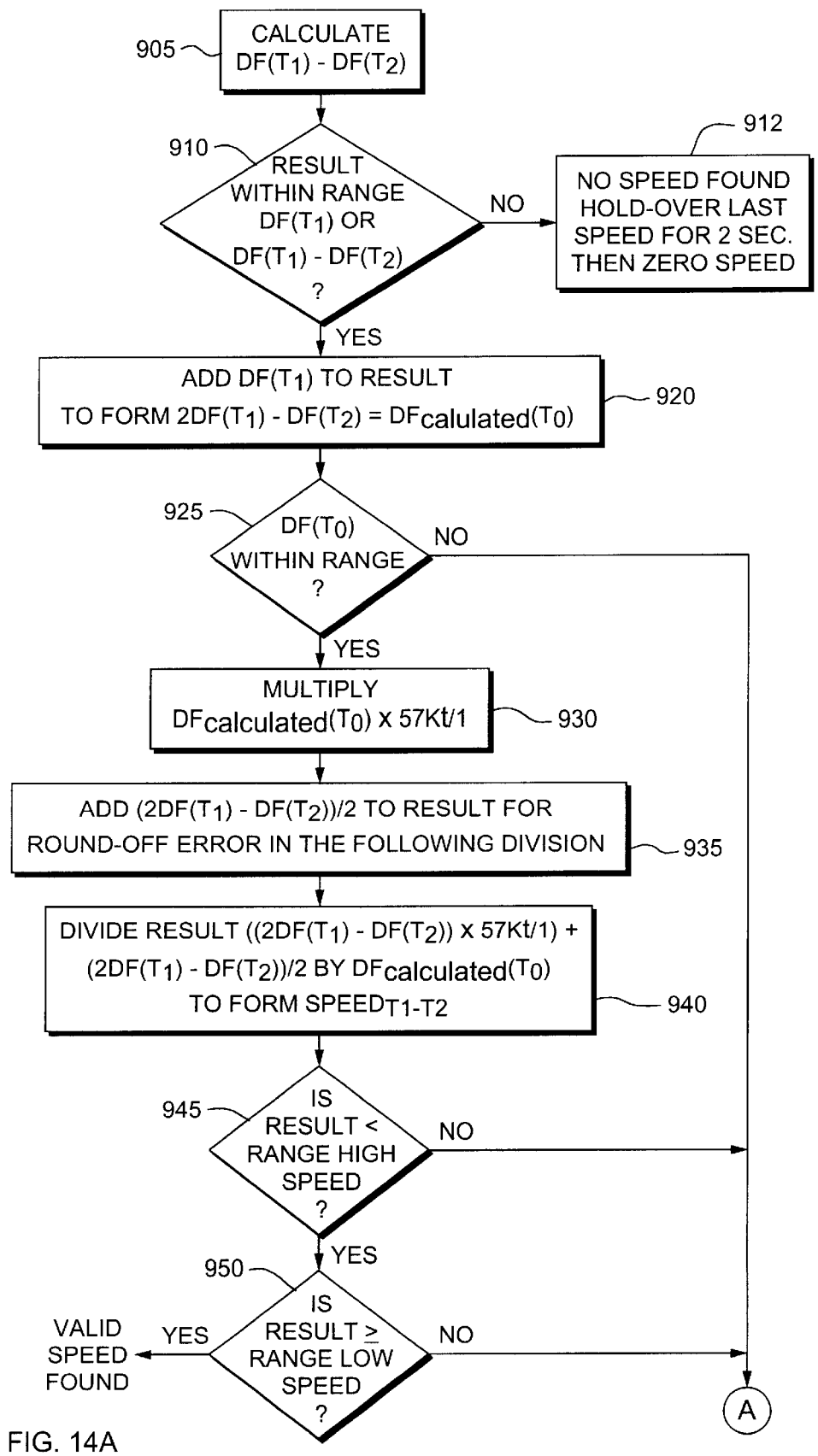
FIGS. 14a–f is a flow diagram of a method for calculating speed based upon a zero-crossing of the correlation function according to certain principles of the present invention.
Figure 14B:
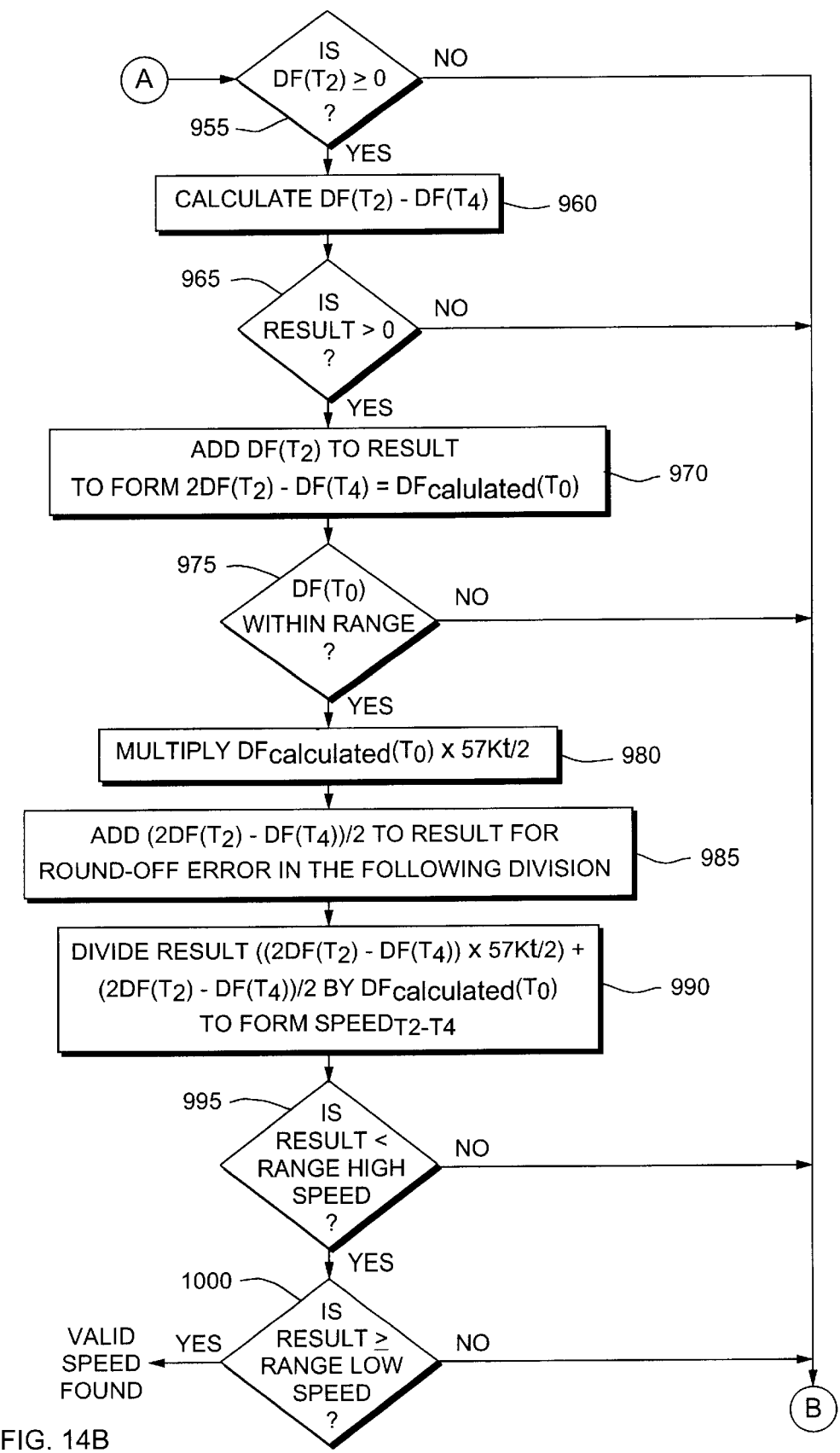

The calculated speed is then compared in step 945 and 950 to determine whether the calculated speed falls within a high speed or low speed value for the range $T_1$ and $T_2$. If so, a valid speed has been found. If the speed result does not fall within range, the speed range $T_2$ to $T_4$ is checked in step 955 (FIG. 14b).

In step 955 (FIG. 14b), it is determined whether the difference function is greater than or equal to zero at time $T_2$.

Figure 14C:
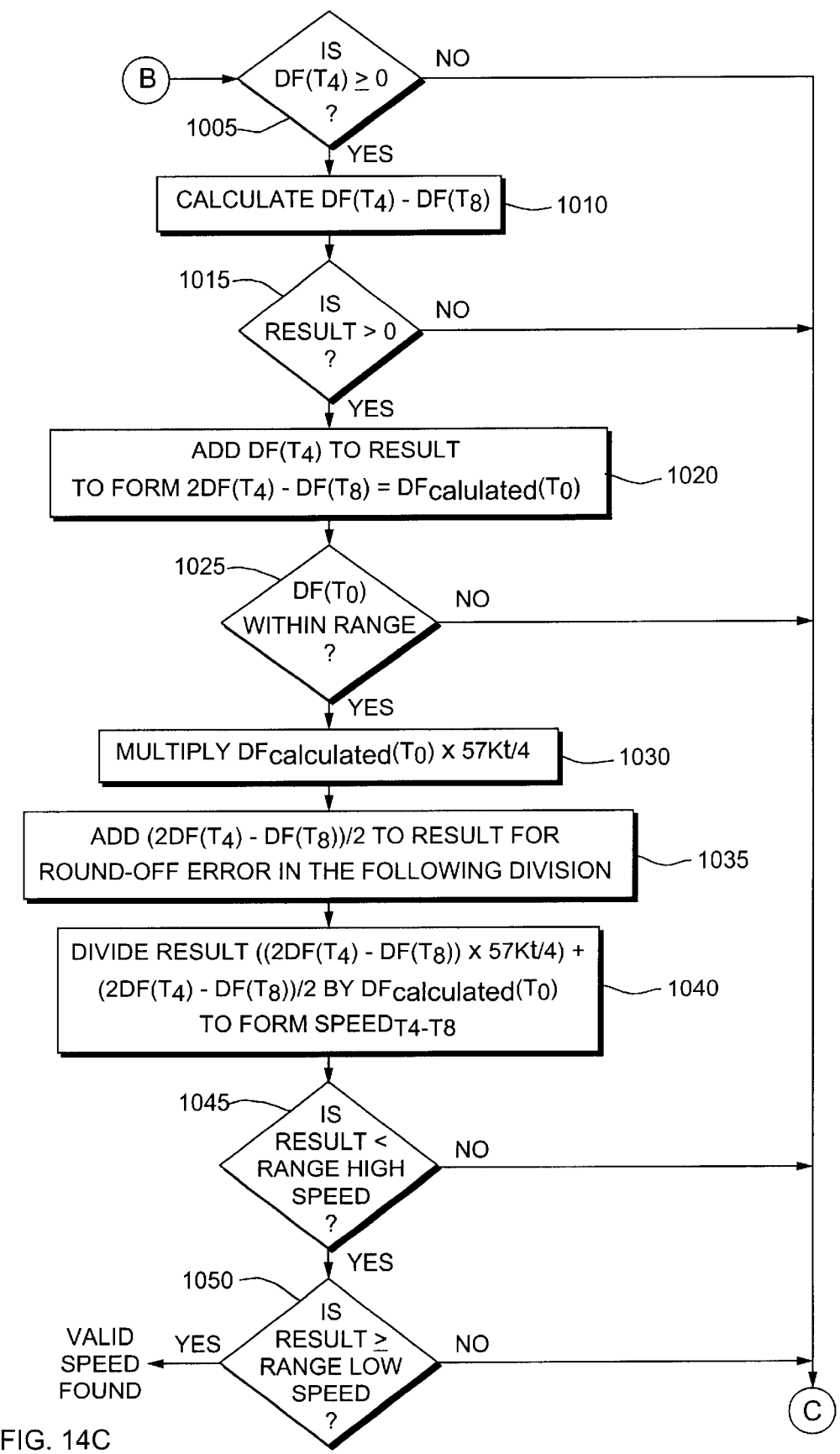
Figure 14D:
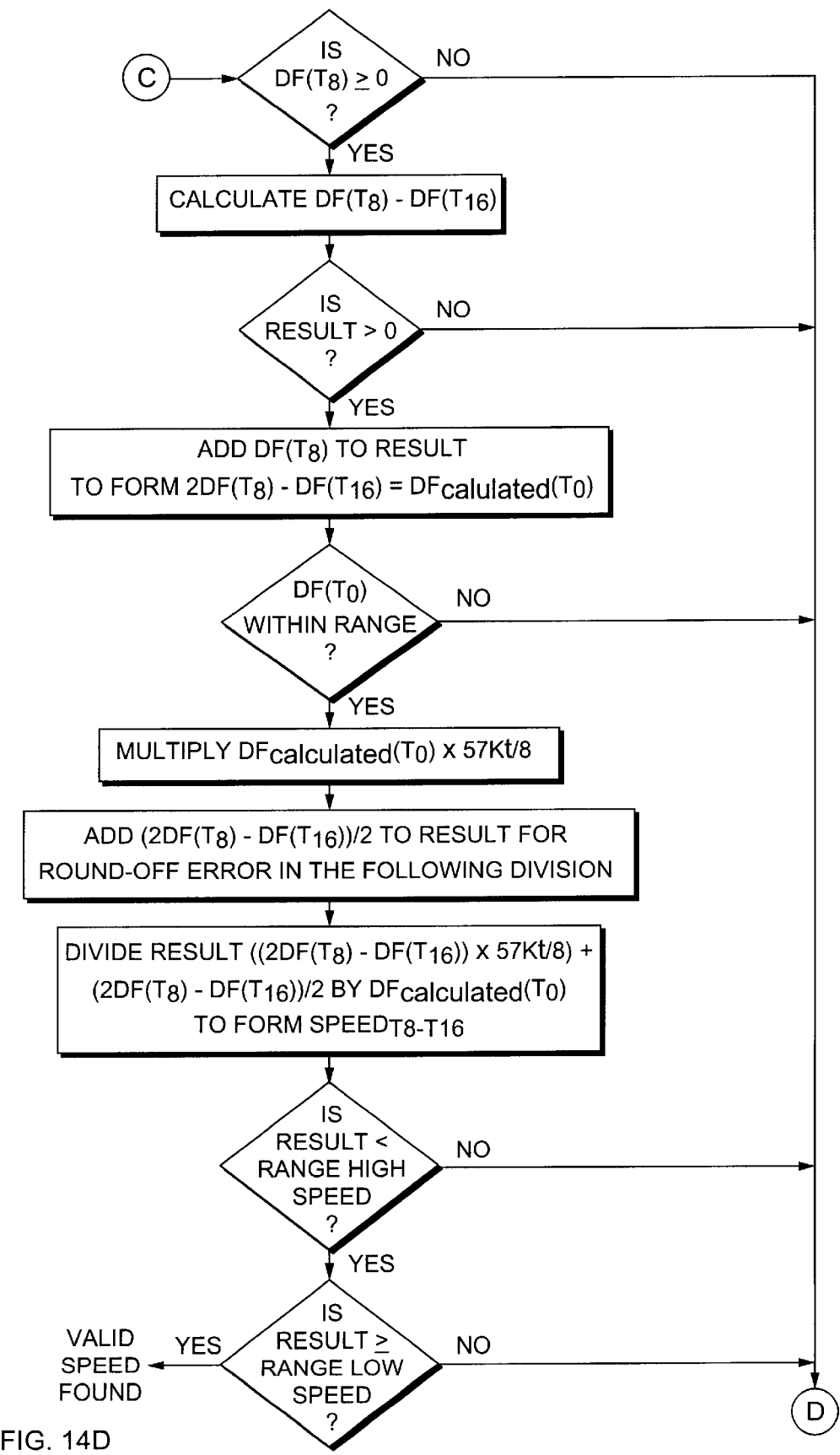
Figure 14E:
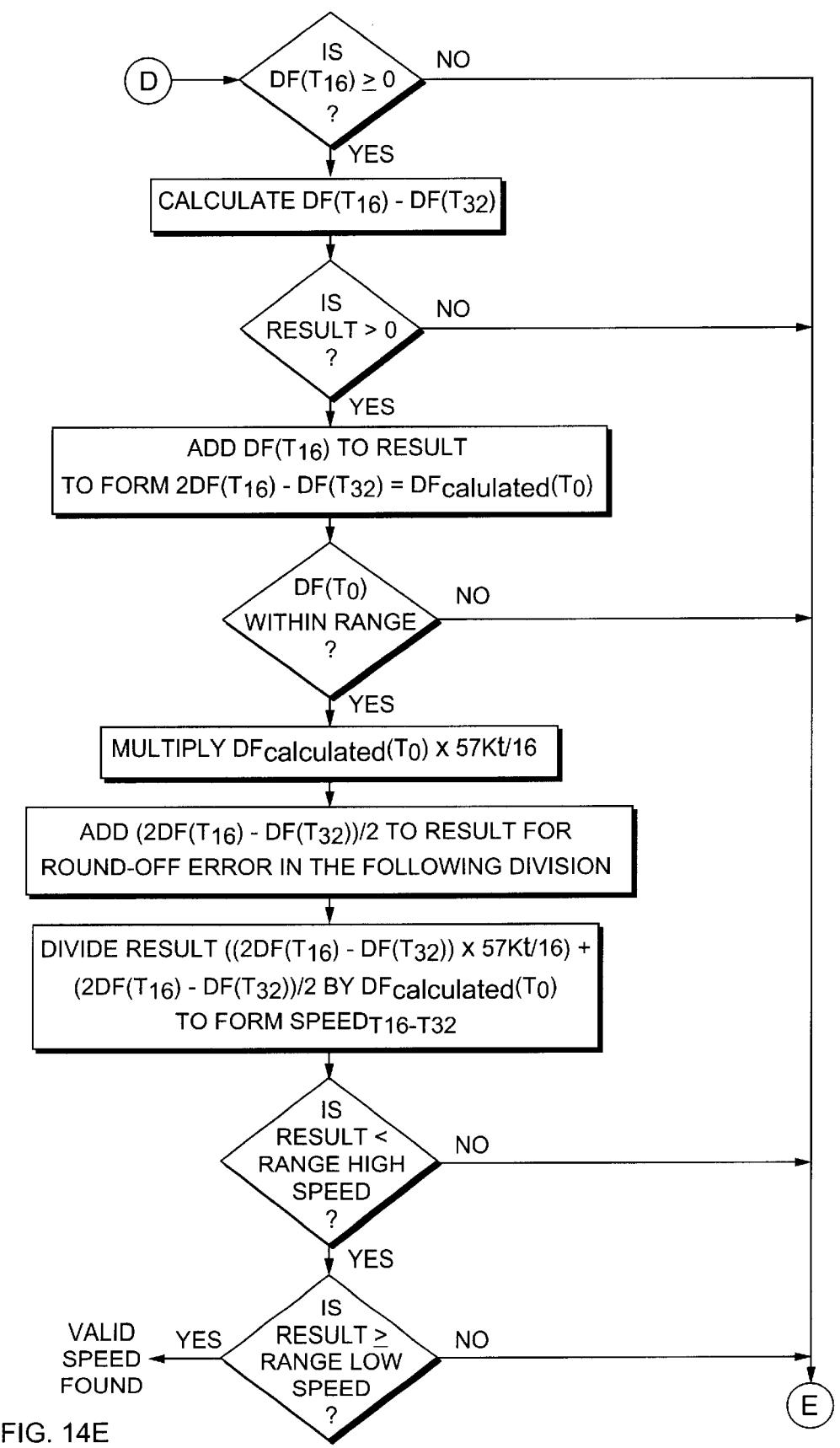
Figure 14F:
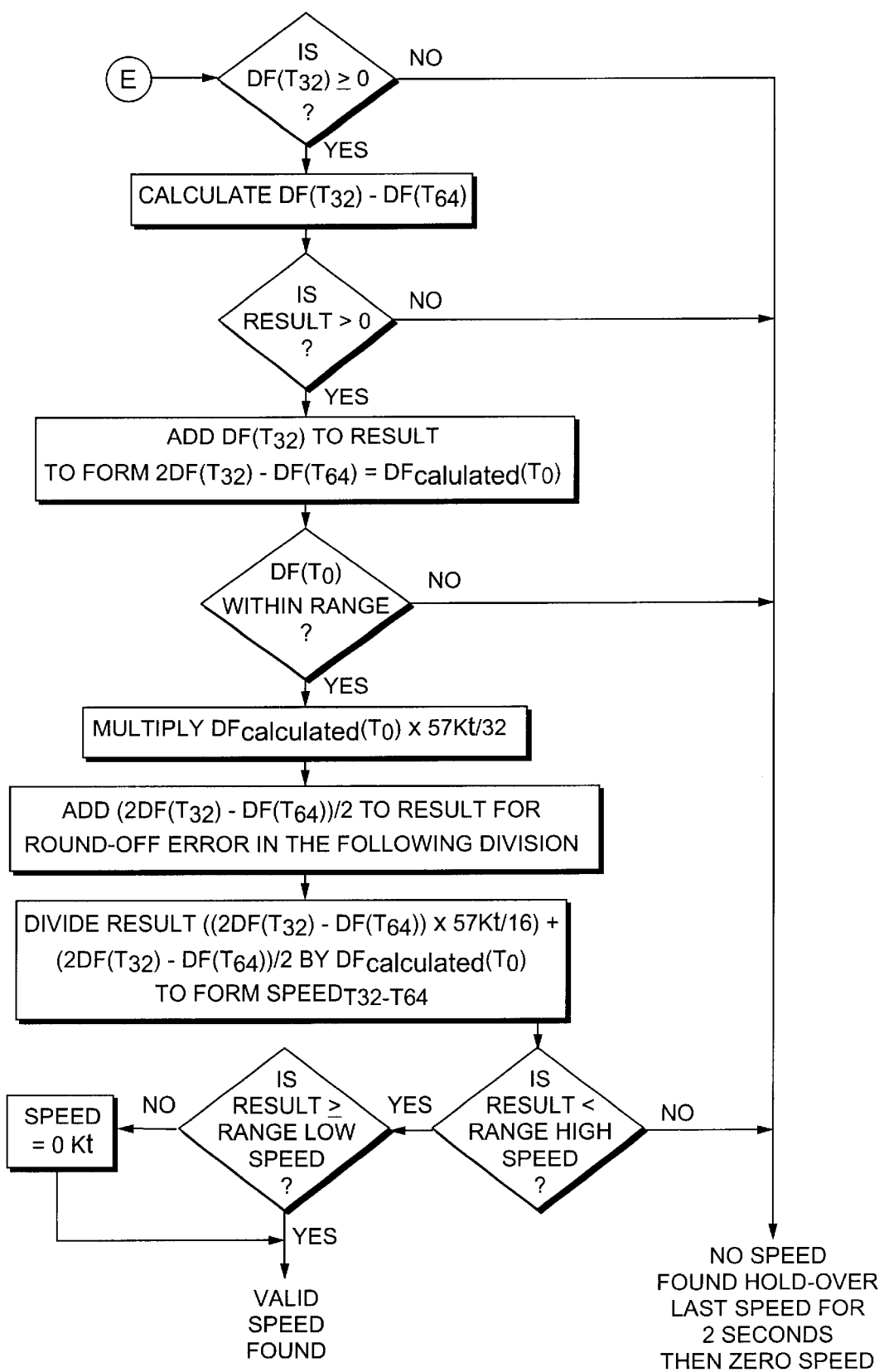

If not, the next lower speed range in FIG. 14c is checked beginning in step 1005.

If the difference function is greater than zero at time $T_2$ in step 955, $DF(T_2)-DF(T_4)$ is calculated in step 960. If the result of $DF(T_2)-DF(T_4)$ is less than zero in step 965, the next lower speed range is checked beginning in step 1005 (FIG. 14c). Otherwise the difference function at $T_0$ is calculated based on $2DF(T_2)-DF(T_4)$ in step 970.

If the result of calculated $DF(T_0)$ in step 970 is not within a predetermined range in step 975, the next lower speed range is checked beginning at step 1005 (FIG. 14c). If the result in step 970 is within an appropriate range in step 975, then speed is calculated based on equations in step 980, 985 and 990.

The calculated speed is then checked against the speed range in step 995 and step 1000 to determine if the result is within an appropriate range. If so, a valid speed has been found. Otherwise, a next lower speed range is checked beginning in step 1005.

As shown in FIG. 14c, steps 1005, 1010, 1015, 1020, 1025, 1030, 1035, 1040, 1045, and 1050 are similar to steps 955, 960, 965, 970, 975, 980, 985, 990, 995 and 1000 respectively, as explained with reference to FIG. 14b.

The aforementioned process of determining speed continues in each of the ranges until a valid speed has been found.

Figure 15:
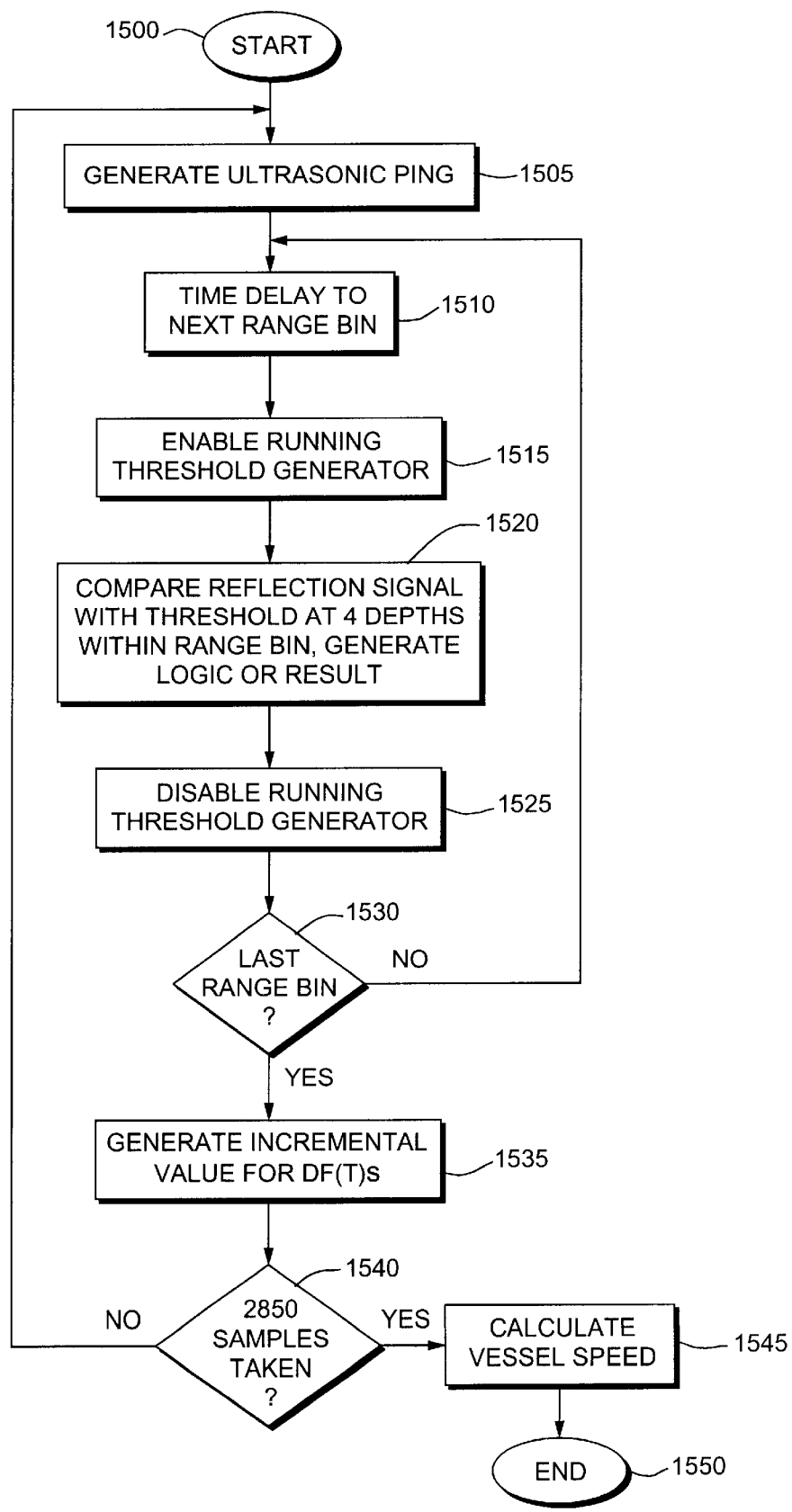
FIG. 15 is a flow chart illustrating the process associated with generating a vessel speed according to certain principles of the present invention.

FIG. 15 is a flow chart illustrating the process associated with generating a vessel speed. Step 1500 shows the entry point of the flow process. An ultrasonic ping is first generated in step 1505. As mentioned, a time delay is incorporated before sampling a particular range bin in step 1510 to allow time for the ultrasonic signal to travel through the medium and bounce back to the receiver. In step 1515, the running threshold signal for the range bin is activated so that the running threshold signal tracks the value of the reflection signal during a range bin only.

In step 1520, four samples within a range bin are compared to the running threshold signal, where a logic 1 is noted if the running threshold is less than the intensity of the reflection signal at a sample point. If any of the four samples of the reflection signal within a range bin is greater than the running threshold, a logic 1 is stored as compare result data for the range bin and a particular ping. This compare result data is then stored in appropriate shift register.

The running threshold generator is then disabled in step 1525 after sampling of the range bin.

Step 1530 provides a flow back to step 1510 if all range bins have not been sampled following an ultrasonic ping. After all range bins have been sampled in step 1530, the incremental value for each DF(T) is calculated in step 1535. Thereafter, the aforementioned routine repeats following step 1540 to perform 2850 successive samples for each range bin. After the appropriate number of samples is taken in step 1540, vessel speed is calculated based on the generated values for the DF(T)s in step 1545. Step 1550 shows the end of the flow process.

It should be noted that there is typically a pair of shift registers for each monitored range bin, and that a set of DF(T)s are generated based on sample compare data in each corresponding pair of shift registers. Thereafter, a vessel speed is generated based on averaging the calculated speed for each range bin.

Alternatively, a single set of DF(T)s are optionally generated based on the compare sample data in multiple range bins.

Figure 16:
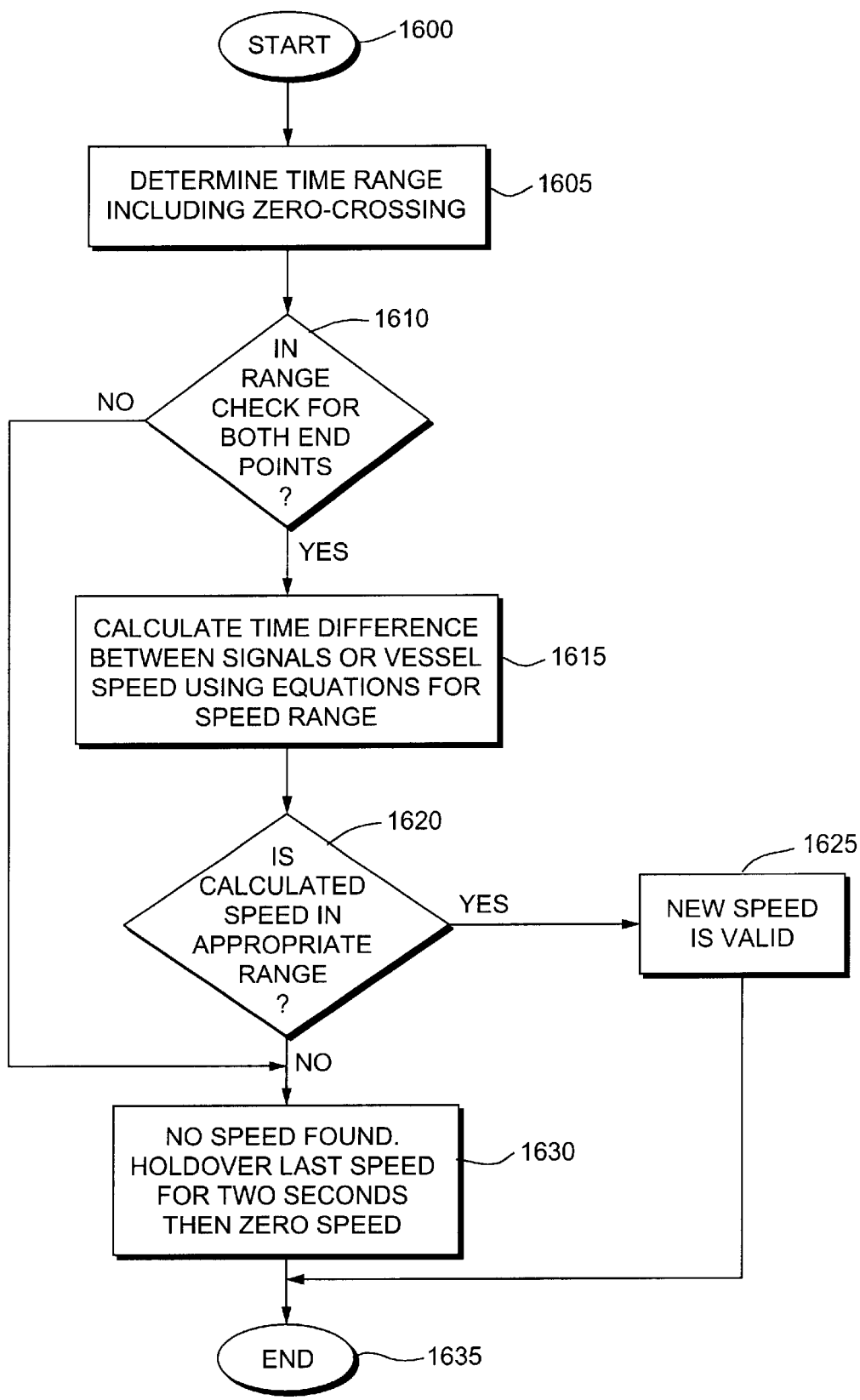
FIG. 16 is a flow chart illustrating details of how the correlation function is used to calculate vessel speed according to certain principles of the present invention.

FIG. 16 is a flow chart illustrating details of how the correlation function is used to calculate vessel speed. Step 1600 shows the start of the flow process.

In step 1605, the range of points including the zero-crossing is first determined. For example, if $T_4$ corresponds with the DF(T) point on the left and above the zero-crossing while $T_8$ corresponds with the DF(T) on the right and below the zero-crossing, the speed range is $T_4 T_8$.

In step 1610, a range check is performed on the value of DF(T) at the corresponding range endpoints, i.e., such as $T_4$ and $T_8$, to determine if the data for DF(T) is within a predetermined range. If the values for a given DF(T) fall outside a corresponding predetermined range, no speed is found and the last calculated speed is held-over for two seconds. In other words, if it is known that the data is bad based on a range check, the data is not used to determine vessel speed.

If the value for the DF(T)s at the range endpoints is within the appropriate range in step 1610, a vessel speed is calculated in step 1615 using the appropriate speed equation for the speed range. Thereafter, a range check is performed on the calculated vessel speed. If the vessel speed is within range, a new vessel speed is recorded in step 1625. Alternatively, if the calculated vessel speed is not within the predetermined range in step 1620, no speed is found and the last speed is held over for two seconds in step 1630. Step 1635 shows the end of the flow process.

The routines as described in FIGS. 15 and 16 are repeated on a continuous basis such that a new vessel speed is generated every ½ second interval based on the previous two seconds of sampled data. For example, the last four ½ second intervals of sample data used to generate a corresponding vessel speed are averaged to generate a vessel speed for the past 2 second time frame.

One aspect of the present invention is directed towards reducing inaccuracies in reported vessel speed. One type of vessel speed inaccuracy is speed "jitter", in which an erroneously reported vessel speed erratically jumps around an actual speed of the corresponding vessel. This can be particularly annoying to a pilot who must react and potentially make life-critical navigation decisions based upon a displayed vessel speed. It is therefore desirable that vessel speed as displayed to the pilot accurately represents the speed of a corresponding vessel, with minimal jitter.

Speed "jitter" can arise as a result of normal statistical variations in input data and is potentially exacerbated by using extrapolation techniques to determine vessel speed. For example, the zero-crossing of the difference function DF(T) can drift outside a range established by two sample points of the difference function. When the zero-crossing drifts outside a range previously used to interpolate vessel speed, extrapolation techniques as previously discussed can then be used to calculate speed. However, computational errors can increase when extrapolation is employed, thus increasing the amount of speed jitter.

Figure 19:
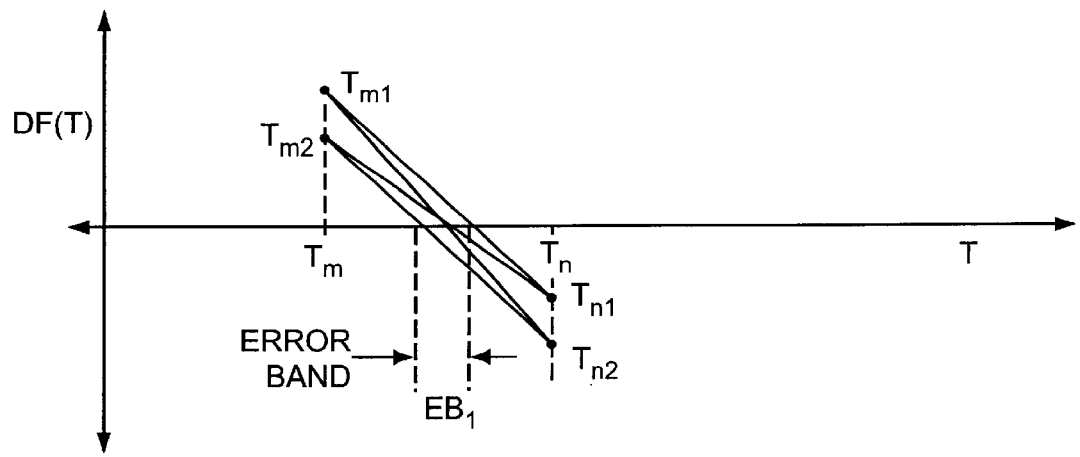
FIG. 19 is a graph illustrating how statistical variations in a difference function can affect a zero-crossing measurement based upon interpolation according to certain principles of the present invention.

FIG. 19 is a graph illustrating how statistical variations in a difference function can affect a vessel speed measurement based upon interpolation according to certain principles of the present invention.

As shown, a value of the difference function at $T_m$ and $T_n$ can vary due to statistical variations in sample data. Statistical variations are shown as $T_{m1}$ and $T_{m2}$ for $T_m$. Similarly, statistical variations are shown as $T_{n1}$ and $T_{n2}$ for $T_n$. When interpolation techniques are used to determine the zero-crossing on the T-axis, the resulting error band is defined by $EB_1$.

Figure 20:
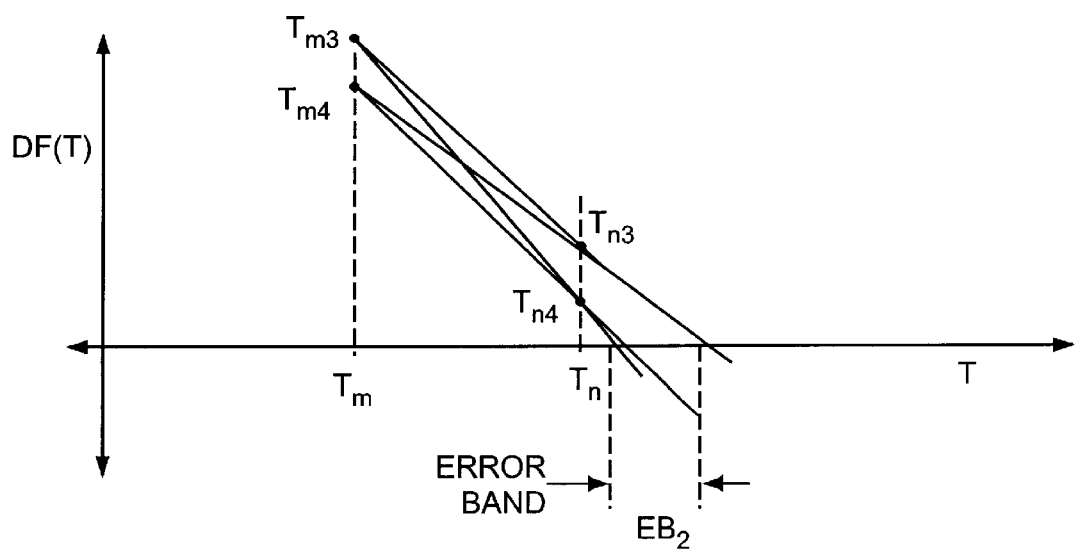
FIG. 20 is a graph illustrating how statistical variations in a difference function can affect a zero-crossing measurement based on extrapolation according to certain principles of the present invention.

FIG. 20 is a graph illustrating how statistical variations in a difference function can affect a vessel speed measurement based on extrapolation according to certain principles of the present invention.

As shown, a value of the difference function at $T_m$ and $T_n$ can vary due to statistical variations in sample data. When extrapolation techniques are used to determine the zero-crossing on the T-axis, the resulting error band, $EB_2$, can be much larger than $EB_1$ as shown in previous FIG. 19. Thus, use of extrapolation techniques can exacerbate errors in calculated vessel speed.

Figure 23:
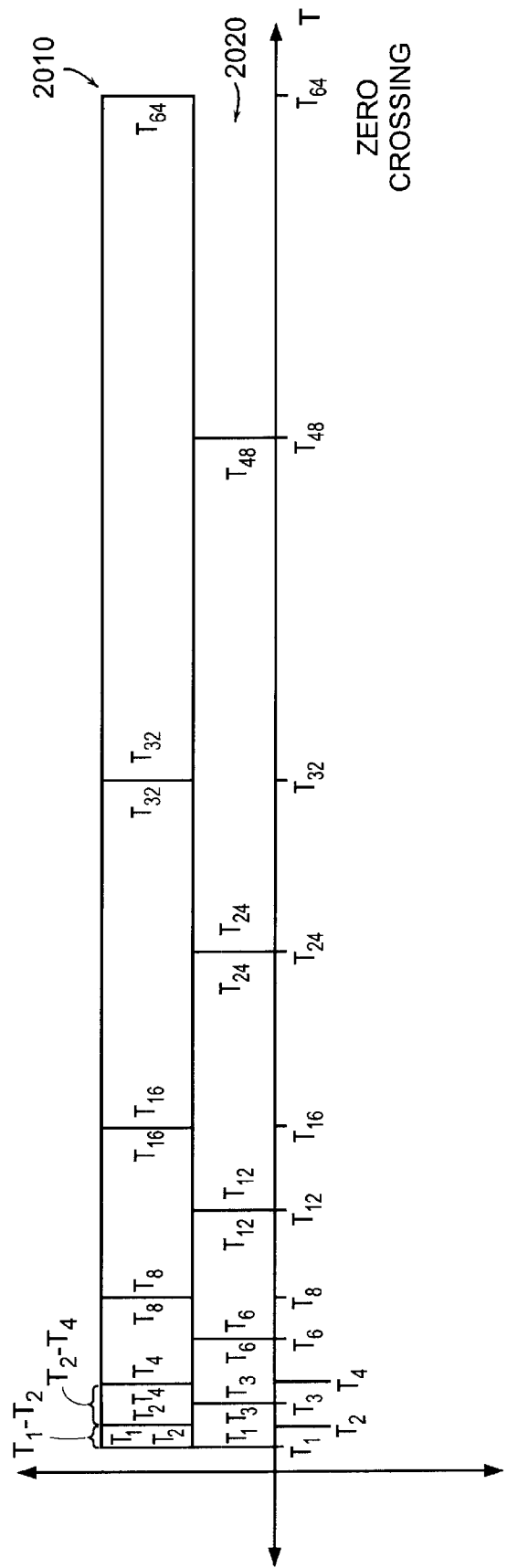
FIG. 23 is a graph illustrating overlapping ranges of a generated difference function for interpolating a zero-crossing according to certain principles of the present invention.

According to the principles of the present invention, overlapping ranges can be used to ensure that a speed can always be calculated using interpolation, thus obviating the need to extrapolate. FIG. 23 illustrates sets of overlapping ranges that can be used to determine a zero-crossing for calculating vessel speed. Based on use of the overlapping ranges, a zero-crossing can be determined using interpolation techniques. This will be discussed in more detail later in the specification.

Figure 21:
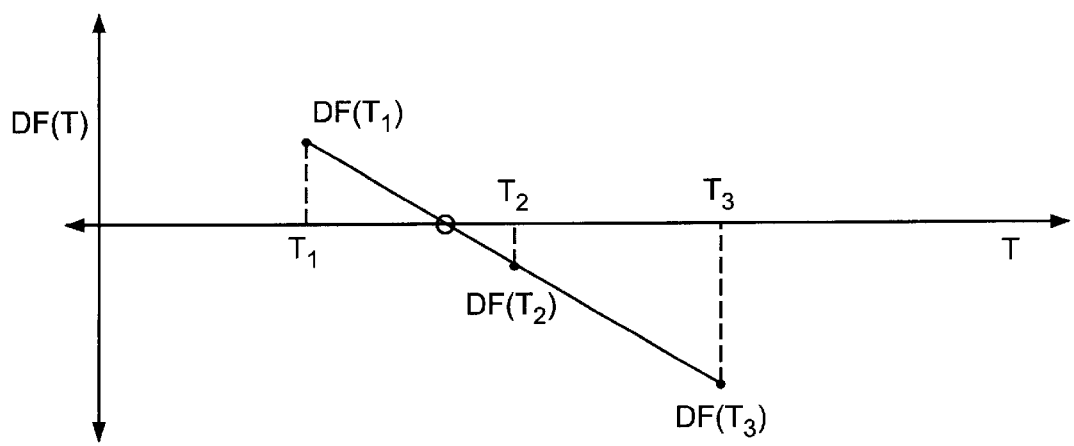
FIG. 21 is a graph of an ideal difference function at multiple points according to certain principles of the present invention.

Jitter can be pronounced when non-ideal conditions cause the difference function to depart from a straight-line curve. For example, consecutive points on the difference function such as $DF(T_1)$, $DF(T_2)$, and $DF(T_3)$ may not form a straight line as shown in FIG. 21.

Non-linearities can be caused by a number of factors. For example, non-linearity in the difference function can be caused by particles that are detected during only part of their travel time as they pass under a transducer element, i.e., monitored region. More specifically, particles skirting past the periphery of a monitored region can produce non-linearities in the difference function. Also, the transducer elements monitoring a region can have reduced sensitivity at the periphery of a monitored region compared with the center of a monitored region.

Additionally, eddies and currents in the water beneath the sensor unit can cause some of the monitored particles to traverse across the transducer elements at an angle or cause the particles to change depths so that they are monitored for only a portion of a time that they are near or beneath a sensor. Consequently, some particles exit a monitored region before they have a chance to travel and be detected across the full face of the transducer.

Yet further, particles that are disposed at a farther distance from the transducer sensors typically provide weaker echoes from earlier pings. Such echoes are sometimes barely detectable at a threshold detector. These particles located farther from the sensor can also be traveling at a different speed than those in other monitored layers.

As a result of all these and other factors, the autocorrelation function can be distorted, which in turn causes the difference function to be distorted or non-linear. In some cases, such distortion appears as a slight curvature, i.e., DF(T) values closer to the T axis have a larger magnitude than they would ordinarily have in the absence of this phenomenon.

FIG. 21 is a graph of an ideal difference function at multiple points according to certain principles of the present invention. Without statistical variations in sample data, the difference function does not include non-linearities and a zero-crossing can be accurately determined using either interpolation or extrapolation.

Figure 22:
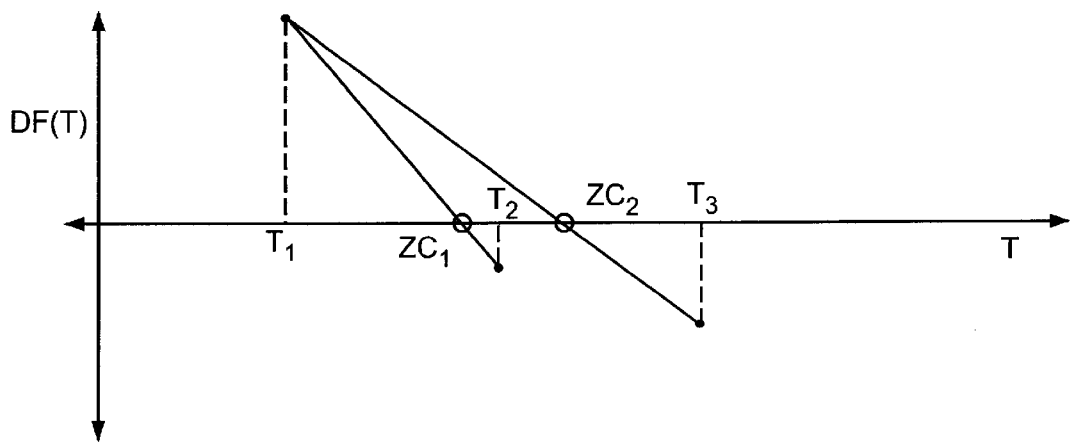
FIG. 22 is a graph of a difference function including statistical variations according to certain principles of the present invention.

FIG. 22 is a graph of a difference function including statistical variations according to certain principles of the present invention. As shown, a point at which the zero-crossing crosses the T-axis depends on which endpoints are used to define a range. For example, the zero-crossing is determined to be $ZC_1$ when range $T_1 T_2$ is used. A zero-crossing is otherwise calculated to be $ZC_2$ when range $T_1 T_3$ is used.

FIG. 23 is a graph illustrating overlapping ranges for determining a zero-crossing according to certain principles of the present invention. As shown, difference function DF(T) can include an additional set of sample points defining corresponding ranges for calculating vessel speed. For example, a value of DF(T) can be generated for sample points $T_3$, $T_6$, $T_{12}$, $T_{24}$ and $T_{48}$. These additional sample points are typically interspersed between sample points $T_1$, $T_2$, $T_4$, $T_8$, $T_{16}$, $T_{32}$ and $T_{64}$ as shown and previously discussed. Of course, additional hardware resources can be allocated to support the generation of these sample points for DF(T) and the same general principles for generating a sample point at $T_1$, $T_2$, $T_4$ ... $T_{64}$ can be used to generate a value for DF(T) at $T_3$, $T_6$, $T_{12}$ ... $T_{48}$.

Based on sample points $T_3$, $T_6$, ... $T_{48}$, additional ranges can be established for calculating vessel speed or, more specifically, a zero-crossing within a given range. Upper row of ranges 2010 includes the set of ranges as previously discussed. Bottom row of ranges 2020 includes a second set of ranges, generally overlapping with the first, for calculating vessel speed based on additional sample points $T_3$, $T_6$, ... $T_{48}$.

In one application, an adjacent set of overlapping ranges can be used to calculate vessel speed when a zero-crossing of DF(T) nears or crosses outside a sample endpoint within a particular range. Accordingly, a zero-crossing always lies within at least some range so that interpolation techniques can be used to determine a precise zero-crossing. Otherwise, a calculation of a zero-crossing value based on extrapolation can result in inaccurate vessel speed calculations.

Figure 24:
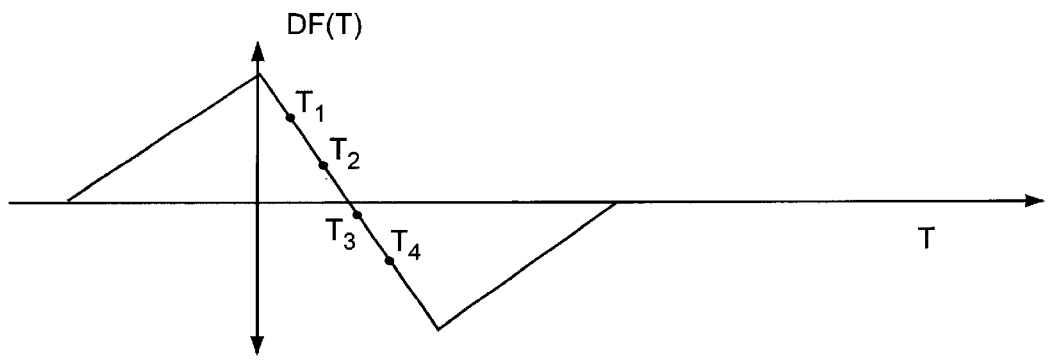
FIG. 24 is a graph of a difference function at a snapshot in time according to certain principles of the present invention.

FIG. 24 is a graph of the difference function DF(T) at a snapshot in time according to certain principles of the present invention. As shown, the zero-crossing along the T-axis falls approximately at or near $T_3$. Thus, a range defined by sample points $T_2$ and $T_4$ as previously discussed can be used to calculate the zero-crossing using interpolation techniques. More specifically, interpolation using two sample endpoints DF($T_2$) and DF($T_4$) can be used to determine a zero-crossing. The zero-crossing value, as previously discussed, can then be used to calculate vessel speed.

Figure 25:
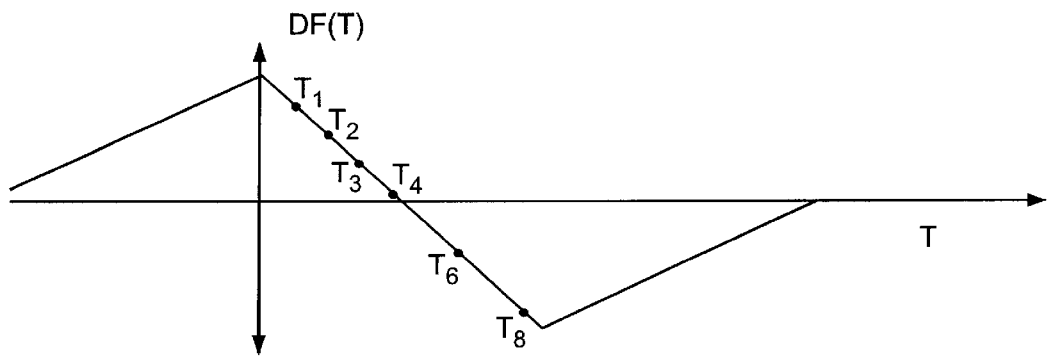
FIG. 25 is a graph of a difference function at a snapshot in time according to certain principles of the present invention.

Consider a difference function DF(T) for a snapshot in time as shown in FIG. 25. As shown, the position of the zero-crossing has changed due to deceleration of the correlation speed sensor and the zero-crossing now lies very close to $T_4$. Although sample points in the range between $T_2$ and $T_4$ can be used to determine the zero-crossing point on the difference function based on extrapolation, a set of sample points defining a new range between $T_3$ and $T_6$ can be selected to interpolate a zero-crossing. Accordingly, vessel speed typically can be more accurately calculated because the zero-crossing lies within this new range defined by $T_3$ and $T_6$.

This illustrates the usefulness of supporting multiple overlapping ranges as shown in FIG. 23. For example, tracking a difference function at multiple sample points to define multiple overlapping ranges ensures that a zero-crossing can be calculated using interpolation techniques.

Figure 26:
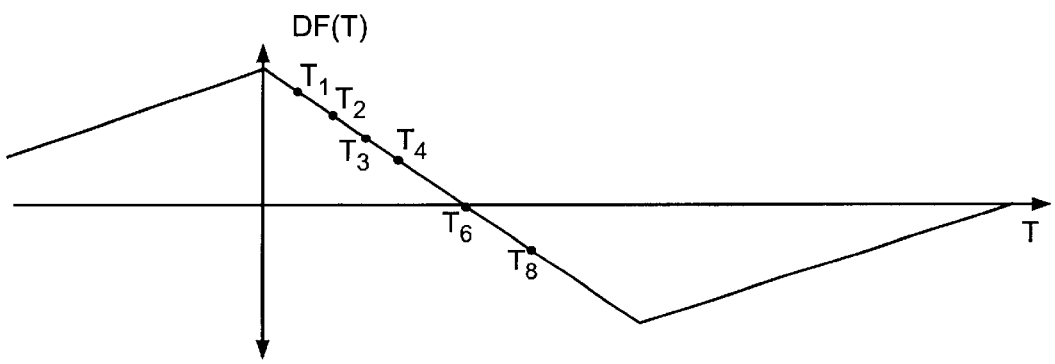
FIG. 26 is a graph of a difference function at a snapshot in time according to certain principles of the present invention.

FIG. 26 is a graph of a difference function illustrating yet a further reduction in vessel speed than that shown in FIG. 25. The zero-crossing nears sample point $T_6$, which is close to an endpoint of previous sample range $T_3$ and $T_6$. Since the zero-crossing is near an endpoint, the new range defined by sample points $T_4$ and $T_8$ can be used to interpolate a zero-crossing for calculating vessel speed. However, the new range is not necessarily used to interpolate a zero-crossing unless it were to further drift so that it is outside of the range $T_3$ $T_6$. This latter case is an example of how hysteresis techniques can be employed.

More specifically, hysteresis can be employed so that a zero-crossing is determined based on interpolation in a given range until the zero-crossing crosses over an endpoint defining the range. For example, assume that the zero-crossing lies near $T_4$ and range $T_3$ $T_6$ is used to determine vessel speed. As vessel speed increases or decreases, the zero-crossing will shift closer to $T_3$ or $T_6$ respectively. When the zero-crossing falls outside either of these endpoints ($T_3$ or $T_6$), a corresponding new range can be selected such as $T_2$ $T_4$ or $T_4$ $T_8$ to interpolate a zero-crossing depending on whether vessel speed increased or decreased. A new range can be selected if the zero-crossing thereafter shifts outside of either endpoint of the newly selected range.

Figure 27A:
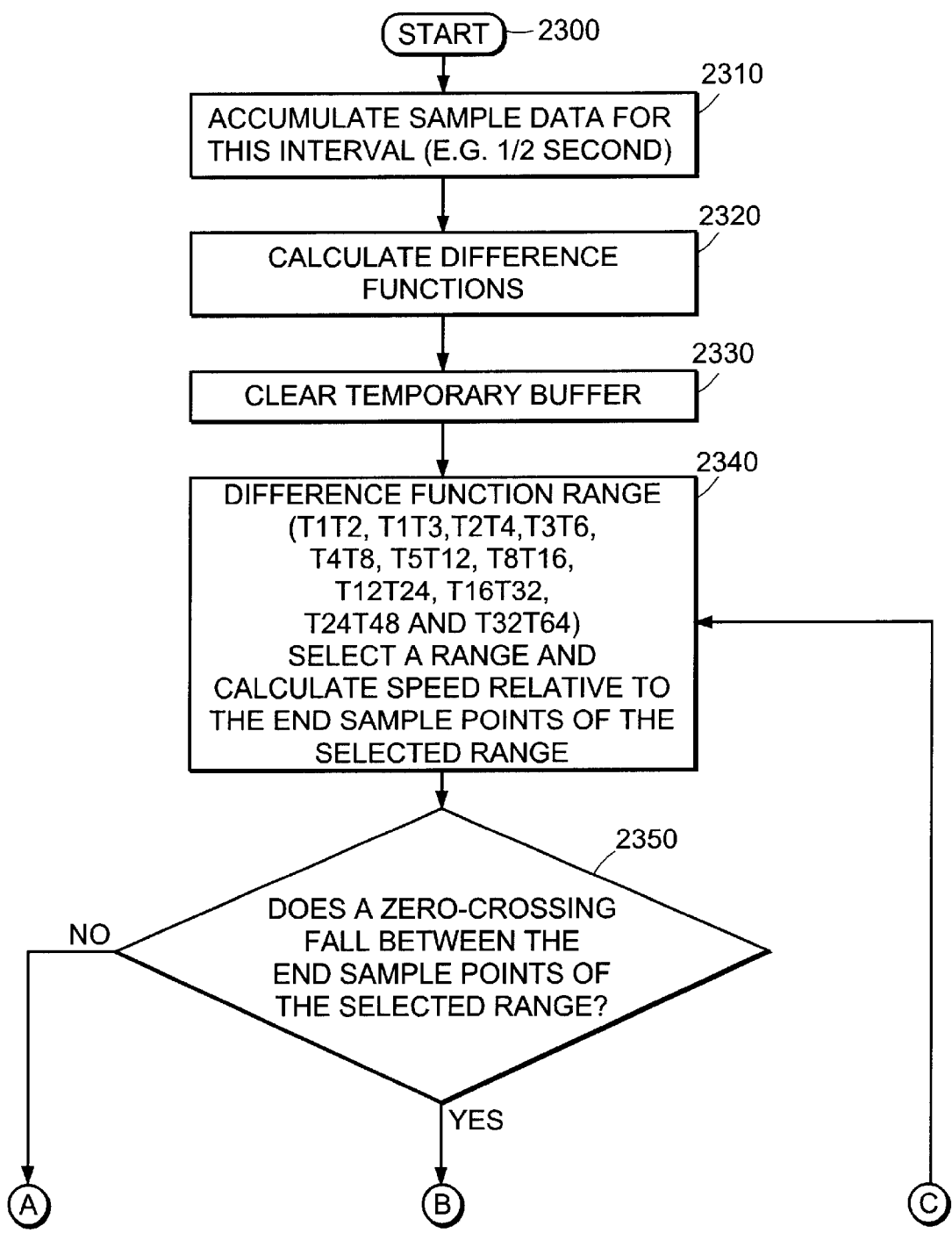
FIG. 27 is a flow chart illustrating a process for selecting an appropriate range to interpolate a zero-crossing according to certain principles of the present invention.
Figure 27B:
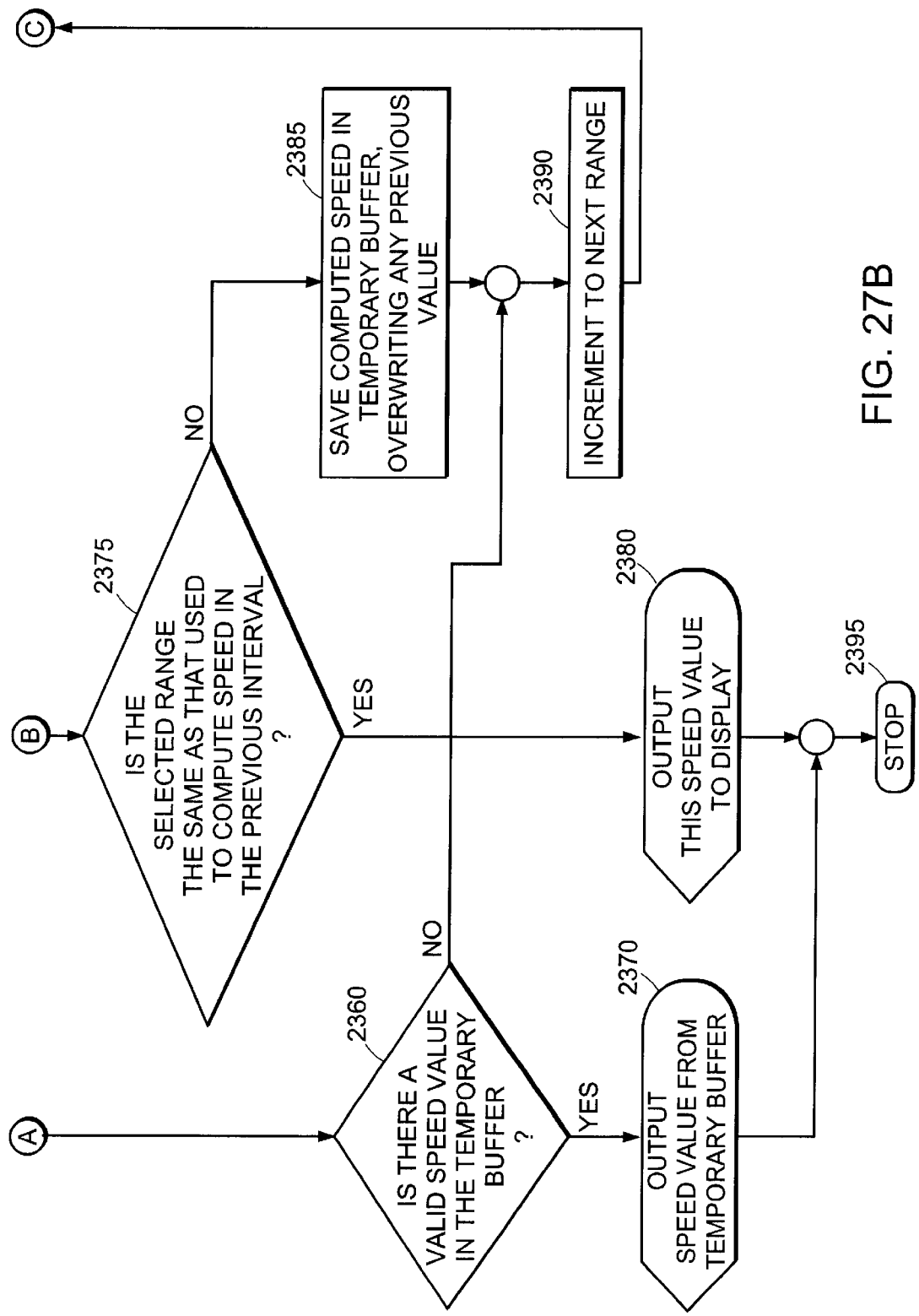

FIG. 27 is a flow chart for interpolating a zero-crossing according to certain principles of the present invention. An entry point into the subroutine is shown at step 2300.

In step 2310, sample data from the monitored region is accumulated to generate a difference function as previously discussed.

In step 2320, the difference function is generated to produce sets of overlapping ranges based on collected sample data.

In step 2330, a temporary buffer for storing difference function data information is cleared.

In step 2340, a speed is calculated for a selected difference function range such as $T_1$ $T_2$, $T_1$ $T_3$, $T_2$ $T_4$, $T_3$ $T_6$, $T_4$ $T_8$, $T_6$ $T_{12}$, $T_8$ $T_{16}$, $T_{12}$ $T_{24}$, $T_{16}$ $T_{32}$, $T_{24}$ $T_{48}$, or $T_{32}$ $T_{64}$. The selected range can be a range previously used to calculate a zero-crossing or a range likely to include the zero-crossing.

In step 2350, it is determined whether a zero-crossing falls between the end sample points of a selected range in the set of overlapping ranges. If so, it is determined in step 2375 whether the selected range is the same as that used to compute speed in a previous interval. If so, the calculated speed value is output to a display device in step 2380.

If the range selected to compute speed in step 2375 was not the same as that used in a previous interval, processing continues at step 2385 where the calculated speed is stored in the temporary buffer overwriting a previous value. Following in step 2390, a different range such as the next overlapping range can be selected to compute vessel speed. Processing thereafter continues at step 2340 as shown.

In the event that a zero-crossing does not fall within a selected range in step 2350, processing continues at step 2360. It is then determined in step 2360 whether there is a valid speed value stored in the temporary buffer. If not, processing continues at step 2390. If so, the speed value in the temporary buffer is output to a display in step 2370.

Generally, this process of calculating vessel speed repeats itself to constantly update vessel speed based on newly collected data that is used to generate the difference function DF(T).

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method comprising:

receiving a first signal;

receiving a second signal whose varying magnitude is similar to that of the first signal but is shifted in time;

sampling the first and second signals to generate a discrete mathematical function;

maintaining the discrete mathematical function at multiple sample points; and defining sets of overlapping ranges based on the sample points, at least one of the ranges being used to interpolate a point on the discrete mathematical function indicating a time difference between the first and second signals.

2. A method as in claim 1 further comprising:
identifying between which pair of multiple sample points of the discrete mathematical function a zero-crossing falls; and
interpolating a position of the zero-crossing within a range defined by the pair of sample points.

3. A method as in claim 1, wherein a magnitude of the first signal is proportional to an intensity of reflections in a first monitored region and a magnitude of the second signal is proportional to an intensity of reflections in a second monitored region.

4. A method as in claim 3, wherein a zero-crossing of the mathematical function on an axis is used to determine vessel speed based on reflections in the first and second monitored regions.

5. A method as in claim 1 further comprising:
generating corresponding first and second running average thresholds based on the first and second signals; and
comparing each of the first and second signals to their respective running average threshold to generate the discrete mathematical function.

6. A method as in claim 5, wherein the step of comparing includes generating a single bit result indicating whether an intensity of a corresponding first or second signal is greater or less than a respective running average threshold.

7. A method as in claim 6, wherein the discrete mathematical function is maintained at logarithmically spaced sample points.

8. A method as in claim 1, wherein the discrete mathematical function is generated based on sample data collected at logarithmically spaced sample times.

9. A method as in claim 1, wherein the discrete mathematical function is generated based on intensity of reflections in a selected layer at a predetermined depth in a first and second monitored regions.

10. A method as in claim 9, wherein the discrete mathematical function is generated based on reflections at multiple layers of the first and second monitored regions.

11. A method as in claim 1, wherein the mathematical function includes non-linearities as a result of variances between the first and second signals.

12. A method as in claim 1, wherein the discrete mathematical function is based on an auto-correlation function of the first signal, an auto-correlation function of the second signal and a cross-correlation function between the first and second signals.

13. A method as in claim 1 further comprising:
calculating a zero-crossing in a first range of the multiple overlapping ranges defined by sample points;
based on an updated mathematical function, detecting that a position of a zero-crossing on the discrete mathematical function falls outside the first range;
identifying a second range that is at least partly overlapping with the first range in which the zero-crossing falls; and
calculating a new zero-crossing in the second range of the discrete mathematical function.

14. A method as in claim 1 further comprising:
interpolating a zero-crossing in a first range of the multiple overlapping ranges defined by sample points of the discrete mathematical function;
detecting that a position of the zero-crossing drifts near an end of the first range but still falls within the first range;
identifying a second range that is at least partly overlapping with the first range in which the zero-crossing also falls; and
utilizing the second range to interpolate a zero-crossing of the discrete mathematical function.

15. A method as in claim 14, wherein the second range is selected so that the zero-crossing is approximately in a middle region of the second range.

16. A method as in claim 1 further comprising:
interpolating a zero-crossing in a first range of the multiple overlapping ranges defined by sample points of the discrete mathematical function;
detecting that a position of the zero-crossing drifts near an end of the first range but still falls within the first range;
identifying a second range of the discrete mathematical function that is at least partly overlapping with first range in which the zero-crossing also falls; and
utilizing the first range to interpolate a zero-crossing of the discrete mathematical function even though the second range could be used to calculate the time difference between signals.

17. A method as in claim 3, wherein ultrasonic sensors are used to generate pings and monitor reflections in the first and second regions.

18. A method as in claim 1 further comprising:
comparing the first and second signals to corresponding threshold signals to generate the discrete mathematical function.

19. A method as in claim 18 further comprising:
storing compare results between each of the first and second signals and corresponding thresholds; and
utilizing the compare results to generate the discrete mathematical function.

20. A method as in claim 3, wherein the mathematical function is used to determine a relative speed of fluid with respect to a sensor based on reflections in the first and second monitored regions.

21. A method comprising:
based on samples taken during a first time interval, generating a difference function at discrete sample points to correlate two echo signals;
analyzing the difference function in a first range defined by a first pair of sample points of the difference function to interpolate a time difference between the two echo signals;
based on samples taken in a second time interval, generating an updated difference function at discrete sample points to correlate the two echo signals; and
determining whether a time difference between the two echo signals can be interpolated based on the first range of the updated difference function and, if not, selecting a second pair of sample points of the difference function whose range at least partly overlaps with the first pair of sample points to interpolate a time difference between the two echo signals.

22. A method as in claim 21 further comprising:
parsing the difference function into multiple overlapping ranges based on the sample points of the difference function.

23. A method as in claim 21, wherein the two echo signals are reflections from pings generated by corresponding ultrasonic transducer devices.

24. A method as in claim 21, wherein the difference function generated from samples in the second time interval is at least partly derived from sample data collected in the first time interval.

25. A method as in claim 21, wherein the difference function is used to determine a relative speed of fluid with respect to corresponding sensors monitoring reflections in first and second regions.

26. A method as in claim 21 further comprising:
based on the updated difference function, determining whether a time difference between the two echo signals can be interpolated based on the first range and, if so, calculating a time difference in the first range.

27. A method as in claim 26 further comprising:
calculating a vessel speed based on the time difference identified in the first range.

28. A method as in claim 21 further comprising:
identifying that a time difference between signals can be interpolated based on a first range or an at least partially overlapping second range of the difference function;
calculating the time difference based on the first range;
later in time, identifying that a time difference can be interpolated based on a first range or an at least partially overlapping third range;
calculating the time difference based on the first range even though the third range could be used to interpolate the time difference between signals.

29. A method as in claim 27, wherein the displayed vessel speed is a weighted average of previously calculated vessel speeds.

30. An apparatus comprising:
a first receiver circuit to receive a first signal;
a second receiver circuit to receive a second signal whose time-varying magnitude approximates that of the first signal but is shifted in time;
a sampling circuit that samples the first and second signals to generate a discrete mathematical function; and
a processing circuit to maintain the discrete mathematical function at selected sample points that define overlapping ranges, at least one of the overlapping ranges being used to interpolate a point on the discrete mathematical function indicating a time difference between the first and second signals.

31. A method of correlating at least two signals, the method comprising:
generating a mathematical function at discrete sample points based on the at least two signals, a time difference signals relating to speed;
identifying that a time difference between the two signals can be interpolated based on a first range or a second range of the mathematical function, the second range being at least partially overlapping with the first range; and
calculating the time difference between the two signals based on the first range.

32. A method as in claim 31, wherein the mathematical function is continuously updated based on samplings of the at least two signals.

33. A method as in claim 32 further comprising:
generating an updated mathematical function based on new sample data of the two signals;
identifying that a time difference between the two signals can be interpolated based on a first range or a third range of the updated mathematical function, the third range being at least partially overlapping with the first range but non-inclusive of the second range; and
calculating the time difference based on the first range of the updated mathematical function even though the third range could be used to interpolate the time difference between signals.

34. A method as in claim 33, wherein the second range and third range of the mathematical function are contiguous with each other.

35. A method as in claim 32 further comprising:
generating an updated mathematical function based on new sampling data of the at least two signals;
identifying that a time difference between the two signals can not be interpolated based on the first range but can be interpolated based on the third range of the updated mathematical function, the third range being at least partially overlapping with the first range; and
interpolating the time difference based on the third range of the updated mathematical function.

* * * * *